(12) United States Patent
Cui et al.

(10) Patent No.: US 11,917,652 B2
(45) Date of Patent: Feb. 27, 2024

(54) CARRIER AGGREGATION IN A HIGH SPEED MODE OF A USER EQUIPMENT

(71) Applicant: Apple Inc., Cupertino, CA (US)

(72) Inventors: Jie Cui, San Jose, CA (US); Qiming Li, Beijing (CN); Yang Tang, San Jose, CA (US); Manasa Raghavan, Sunnyvale, CA (US); Huaning Niu, San Jose, CA (US); Hong He, San Jose, CA (US); Weidong Yang, San Diego, CA (US); Chunxuan Ye, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 17/439,511

(22) PCT Filed: Sep. 14, 2021

(86) PCT No.: PCT/US2021/050280
§ 371 (c)(1),
(2) Date: Sep. 15, 2021

(87) PCT Pub. No.: WO2022/086645
PCT Pub. Date: Apr. 28, 2022

(65) Prior Publication Data
US 2022/0303974 A1    Sep. 22, 2022

(30) Foreign Application Priority Data
Oct. 22, 2020   (WO) ................ PCT/CN2020/122993

(51) Int. Cl.
*H04W 72/51*    (2023.01)
*H04W 8/24*    (2009.01)
(Continued)

(52) U.S. Cl.
CPC ............. *H04W 72/51* (2023.01); *H04W 8/24* (2013.01); *H04W 76/15* (2018.02); *H04W 88/02* (2013.01)

(58) Field of Classification Search
CPC ....... H04W 76/15; H04W 8/24; H04W 88/02; H04W 64/006; H04W 72/0453;
(Continued)

(56) References Cited

U.S. PATENT DOCUMENTS

2011/0158104 A1   6/2011  Frenger et al.
2013/0217390 A1   8/2013  Alizadeh-Shabdiz et al.
(Continued)

OTHER PUBLICATIONS

Aggregating LTE and Wi-Fi: Toward Intra-Cell Fairness and High TCP Performance; Boram Jin, Oct. 2017 (Year: 2017).*
(Continued)

*Primary Examiner* — Hirdepal Singh
(74) *Attorney, Agent, or Firm* — Kilpatrick Townsend & Stockton LLP

(57) ABSTRACT

The present application relates to devices and components including apparatus, systems, and methods to provide SCell activation. In one example, a UE may support carrier aggregation in a high speed mode, such FR1 CA in HST. Serving cells can be particularly configured for the carrier aggregation based on the UE's capability to support carrier aggregation in the high speed mode. Additionally or alternatively, an SCell activation procedure can be performed based on this capability.

20 Claims, 16 Drawing Sheets

(51) Int. Cl.
*H04W 76/15* (2018.01)
*H04W 88/02* (2009.01)

(58) Field of Classification Search
CPC ...... H04W 72/21; H04W 72/51; H04L 5/001; H04L 5/0053
USPC ........................................................ 455/450
See application file for complete search history.

(56) References Cited

U.S. PATENT DOCUMENTS

| | | |
|---|---|---|
| 2015/0156636 A1 | 6/2015 | Tabet et al. |
| 2015/0172032 A1* | 6/2015 | Khay-Ibbat ............. H04L 5/001 370/329 |
| 2015/0257089 A1 | 9/2015 | Sun et al. |
| 2017/0078904 A1* | 3/2017 | Tang ..................... H04W 24/10 |
| 2020/0052769 A1* | 2/2020 | Cirik ..................... H04L 1/0026 |
| 2021/0219199 A1* | 7/2021 | Zhang ............... H04W 36/0005 |
| 2021/0243751 A1* | 8/2021 | Saber ..................... H04L 5/0091 |
| 2023/0024061 A1* | 1/2023 | Zhang ..................... H04L 5/001 |
| 2023/0089990 A1* | 3/2023 | Feng ..................... H04L 5/001 370/329 |

OTHER PUBLICATIONS

3rd Generation Partnership Project; Technical Specification Group Radio Access Network; NR; Requirements for support of radio resource management (Release 16), 3GPP TS 38.133 V16.5.0, Sep. 2020, 1608 pages.

3rd Generation Partnership Project; Technical Specification Group Radio Access Network; NR; User Equipment (UE) radio access capabilities (Release 16), 3GPP TS 38.306 V16.2.0, Sep. 2020, 126 pages.

Alsohaily et al., On the Utilization of Multi-Mode User Equipment in Multi-Radio Access Technology Cellular Communication Systems, Institute of Electrical and Electronics Engineers (IEEE), vol. 3, Jun. 3, 2015, pp. 787-792.

International Patent Application No. PCT/US2021/050280, International Search Report and Written Opinion, dated Dec. 28, 2021, 13 pages.

The International Application No. PCT/US2021/050280, "International Preliminary Report on Patentability", dated May 4, 2023, 11 pages.

* cited by examiner

CARRIER AGGREGATION IN A HIGH SPEED MODE OF A USER EQUIPMENT

CROSS-REFERENCE TO RELATED APPLICATION

This application is a 371 U.S. National Phase of PCT International Patent Application No. PCT/US21/50280, filed on Sep. 14, 2021, which claims the benefit of PCT International Application No. PCT/CN2020/122993, filed on Oct. 22, 2020. The contents of both applications are incorporated herein by reference in their entirety for all purposes.

BACKGROUND

Fifth generation mobile network (5G) is a wireless standard that aims to improve upon data transmission speed, reliability, availability, and more. This standard, while still developing, includes numerous details relating to carrier aggregation (CA), where, for instance, a higher data rate may be achieved by using multiple component carriers (CCs) for communications of a user equipment (UE).

DETAILED DESCRIPTION

Figure 1:
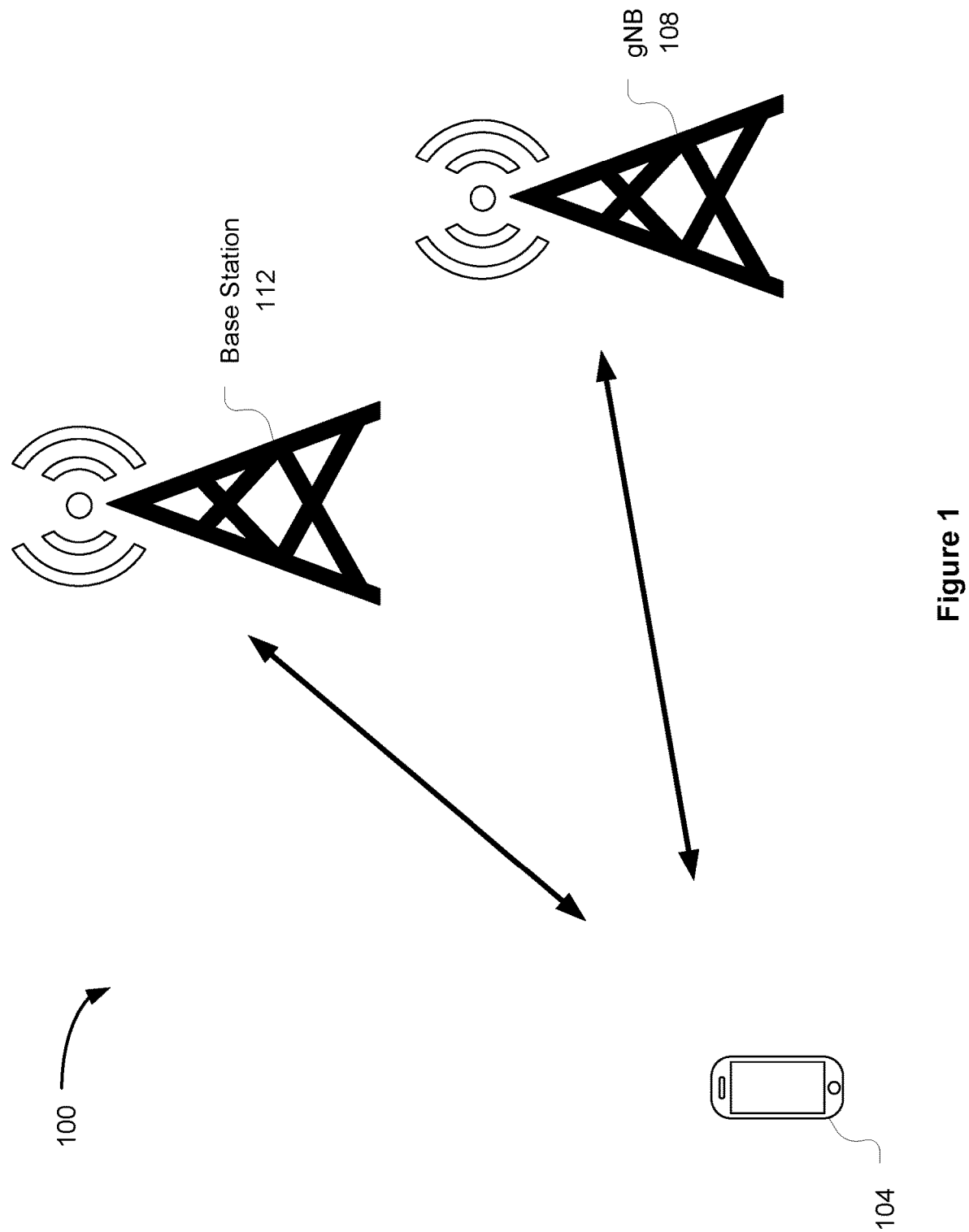
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, carrier aggregation (CA) can be used to increase a data rate of user equipment (UE) communications. CA enables a UE to receive and/or transmit from/to multiple serving cells. The serving cells include a primary cell (PCell) in the case of a single cell group or a primary secondary cell (PSCell) in case of multiple cell groups. The serving cells also include a secondary cell (SCell) in both the single and multiple cell group cases. An SCell activation procedure may be performed, whereby the UE and the base station exchange information about the target serving cells that are being activated. The SCell activation procedure may necessitate measurements on components carriers of the target serving cells and reporting. The completion time of such actions corresponds to an activation delay.

Under certain conditions, the UE may be traveling at a high speed. As used herein, high speed refers to a speed that is larger than a speed threshold, such as fifty Kilometers per hour (Kph), one-hundred Kph, or some other value up to an upper bound, such as five-hundred Kph. When traveling at the high speed, the UE may be operating in a high speed mode. The high speed mode is an operational mode that supports a travel speed of the UE larger than the speed threshold. The high speed mode may also be referred to as a high speed train (HST) mode.

In the high speed mode, the activation delay may impact the mobility performance of the UE. To reduce the activation delay in the high speed mode, different approaches may be used independently of or in conjunction with each other. In one example approach, the total number of component carriers may be reduced. This approach can reduce the amount of needed measurements. In another example approach, intra-band component carriers may be used. This approach may enable the UE to reuse measurements performed on one component carrier for another intra-band component carrier (e.g., antenna gain control (AGC) estimation). In yet another example approach, collocated serving cells are used. This approach may enable the UE to reuse measurements performed on one serving cell for another collocated serving cell (e.g., Doppler shift estimation). If the UE can support inter-band component carriers or non-collocated serving cells, a further example approach can involve configuring non-collocated serving cells and/or inter-band component carriers of collocated or non-collocated serving cells for the carrier aggregation of the UE in the high speed mode. In an additional approach, direct activation can be performed when a serving cell(s) are added via radio resource control (RRC) configuration or during a handover (e.g., no media access control (MAC) control element (CE) may be needed to activate a serving cell after the configuration). Some or all of these approaches can involve signaling from the UE to the network about the UE's SCell activation capabilities in the high speed mode. Additionally or alternatively, some or all of these approaches need not involve the signaling and can rely instead on requirements that the UE needs to support in the high speed mode.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc. that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network, and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to computer, storage, or network resources provided by physical hardware element(s). A "virtualized resource" may refer to computer, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information reference signal (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI to inform the UE 104 of these QCL relationships.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band (between 410 Megahertz (MHz) and 7,125 MHz) and/or frequency range 2 (FR2) band (between 24,250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device applies a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

In an example, the UE 104 supports dual connectivity (DC), whereby the UE 104 can connect and exchange data simultaneously with the gNB 108 and the base station 112. Additionally or alternatively, the UE 104 supports carrier aggregation (CA), whereby the UE 104 can connect and exchange data simultaneously over multiple component carriers (CCs) with the gNB 108 and/or the base station 112. The CCs can belong to a same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CCs. Multiple serving cells can be activated via an SCell activation procedure where the component carriers of these serving cells can be intra-band contiguous, intra-band noon-contiguous, or inter-band. The serving cells can be collocated or non-collocated.

To improve resource usage when CA is configured (e.g., processing burden on the UE 104, battery usage of the UE 104, channel management and load balancing, etc.), an activation/deactivation mechanism of serving cells is supported. Generally, if the UE 104 is configured with one or more serving cells, the gNB 108 may activate and deactivate the configured serving cells. Activation and deactivation typically does not apply to a PCell (or PSCell). After an SCell is configured, such as via higher layer signaling, the SCell is in a deactivated state. An SCell activation procedure is used to activate the SCell and enable transmission/reception on the SCell (e.g., on PDSCH, PDCCH, PUSCH of the SCell). The SCell activation procedure may be triggered when, for instance, there is a need of more data throughput or to load balance traffic on the PCell (or PSCell). The SCell can be activated depending on its channel quality and can be deactivated if its channel quality is low.

Figure 2:
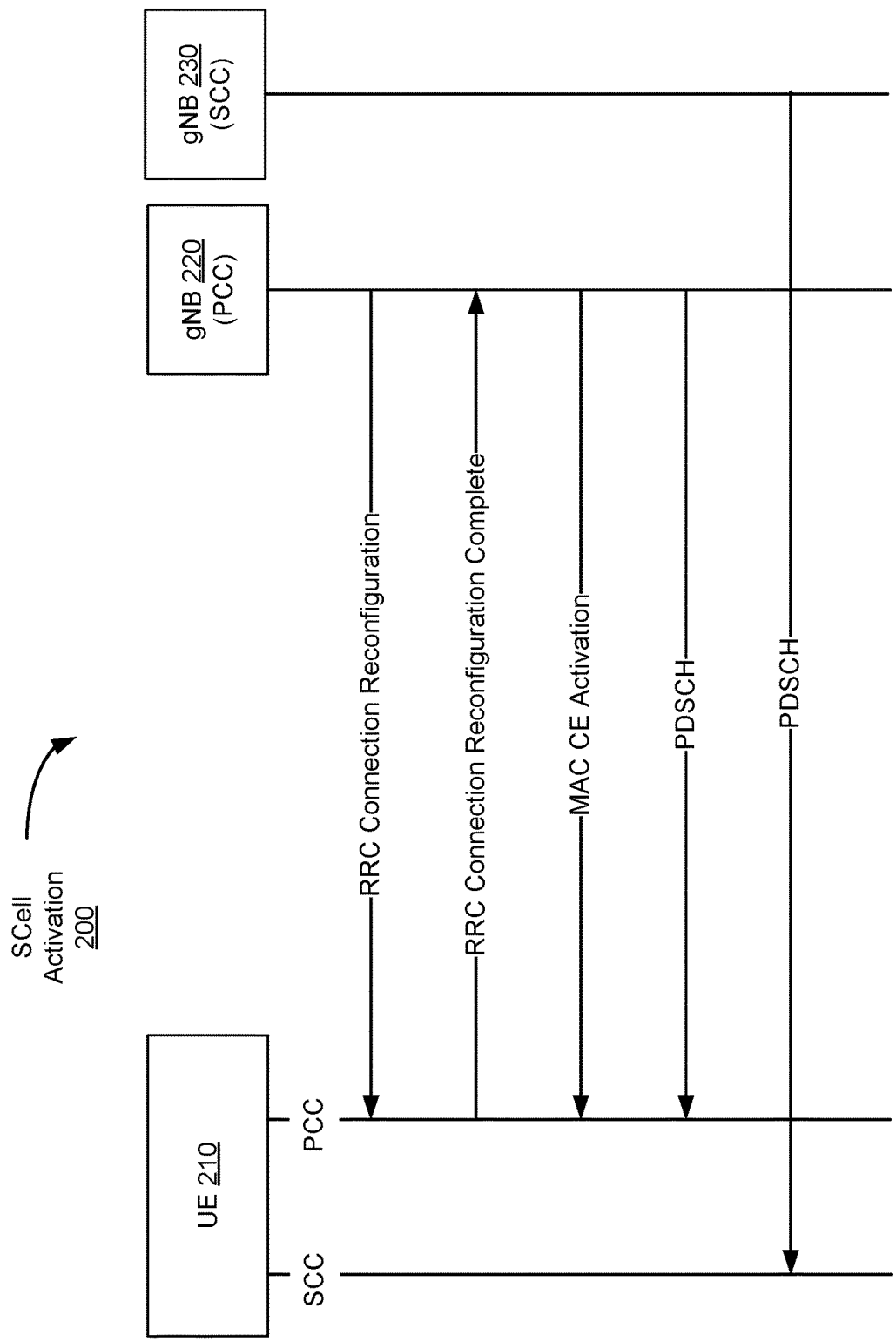
FIG. 2 illustrates an example of activating a serving cell for carrier aggregation, in accordance with some embodiments.

FIG. 2 illustrates an example of activating a serving cell for carrier aggregation, in accordance with some embodiments. In this example, the serving cell is an SCell and the activating is shown as an SCell activation 200. In particular, a UE 210 is in communication with a gNB 220, where the communication uses a PCell (illustrated in FIG. 2 as a primary component carrier (PCC)). For carrier aggregation reasons (e.g., to increase throughput), the gNB 220 configures the UE 210 to use a secondary component carrier (SCC) of an SCell provided by a gNB 230. Although the two gNBs 220 and 230 are shown as being separate from each other, they may be one gNB that supports intra-band or inter-band CCs. The UE 210 is initially configured via an RRC connection reconfiguration indicating the SCell. The SCell is added to the CA configuration of the UE 210, but is in a deactivated state. To activate the SCell, the gNB 220 can send a MAC CE identifying the SCell. The MAC CE triggers the UE 210 to activate the SCell, where the activation includes performing various measurements and reporting back to the gNB 220. Once activated, a PDSCH can be available to the UE 210 on the SCell, in addition to the PDSCH on the PCell.

Typically, the network (e.g., gNB 220 and/or a radio network controller (RNC)) uses an information element (IE) of CellToAddModList in RRCConnectionReconfiguration message to add an SCell for carrier aggregation of the UE 210. At the time of SCell addition, the gNB 220 can send different types of information to the UE 2 101 via a RRCConnectionReconfiguration message. The information can include an SCellIndex that identifies the SCell; a cellIdentification, which is a physical cell identity and downlink carrier frequency (EARFCN); radioResourceConfigCommonSCell, which is an IE for sending system information of the SCell; radioResourceConfigCommonSCell that contains downlink configurations, such as downlink bandwidth, number of antenna ports, and the like; radioResourceConfigDedicatedSCell, which is an IE containing UE specific configurations for the SCell; and radioResourceConfigDedicatedSCell, which includes downlink dedicated configurations, such as information related to transmission mode for the SCell, cross-carrier scheduling configuration, SCell CSI-RS information, and the like. Upon receiving theRRCConnectionReconfiguration message, the UE 210 can execute the SCell addition command and send a message indicating that the RRC connection reconfiguration is complete.

Once configured, the SCell activation can be triggered based on a MAC CE. The MA CE is identified by a MAC protocol data unit (PDU) sub-header with a unique logical channel identifier (LCID), such as "11011." The MAC CE element includes fields, each of which indicates an SCell with a SCellIndex. The MAC CE carries a bitmap for the activation and deactivation of Scells, wherein the bitmap a field set to "1" denotes activation of the corresponding SCell, while a field set to "0" denotes deactivation. With the bitmap, SCells can be activated and deactivated individually, and a single activation/deactivation command can activate/deactivate a subset of the SCells.

Figure 3:
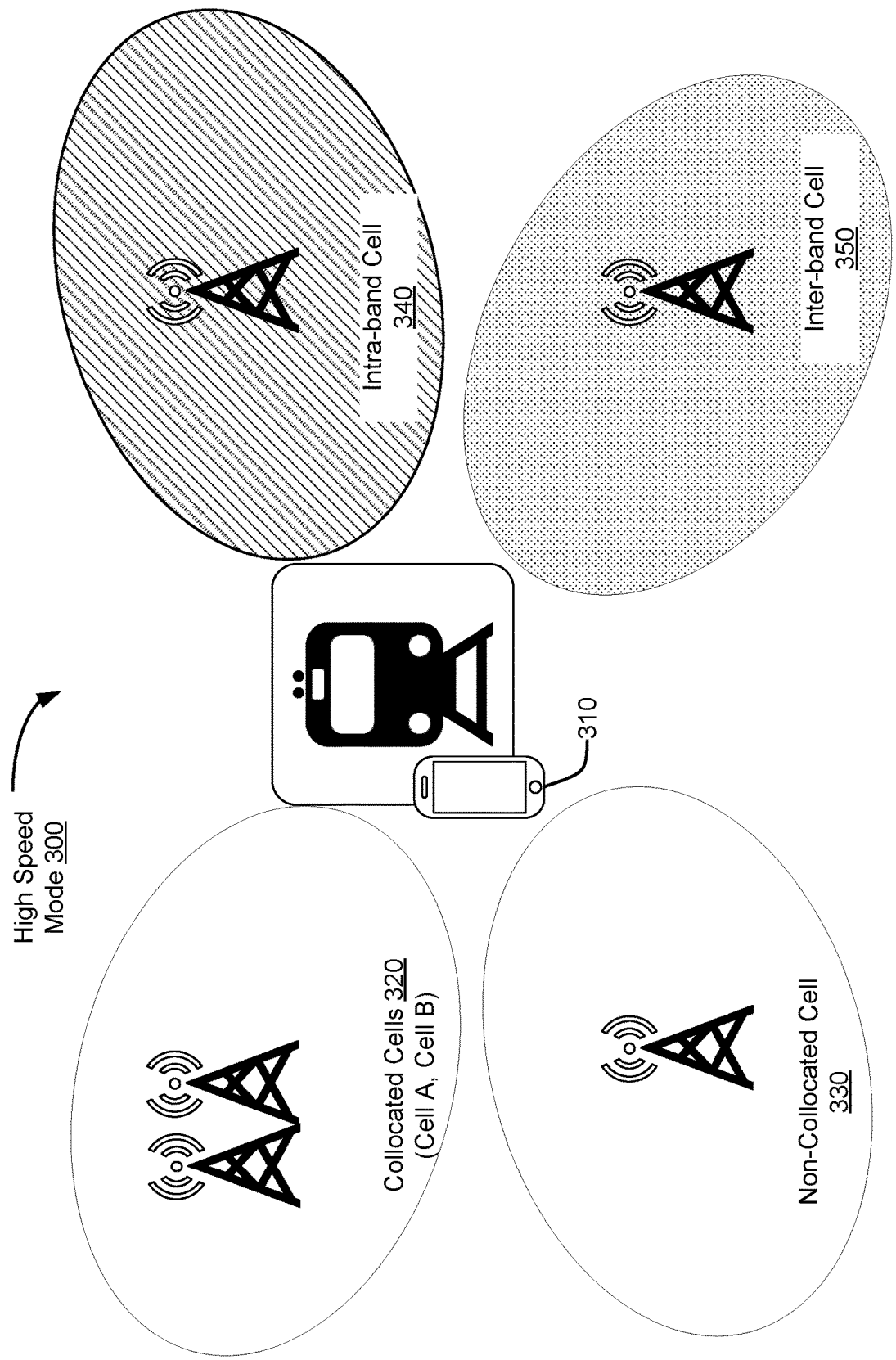
FIG. 3 illustrates an example of possible carrier aggregation configurations in support of a high speed mode of a user equipment (UE), in accordance with some embodiments.

FIG. 3 illustrates an example of possible carrier aggregation configurations in support of a high speed mode 300 of a UE 310, in accordance with some embodiments. In the high speed mode 300, the UE 310 may be traveling at a speed that exceeds a speed threshold. In the illustration of FIG. 3, the high speed mode 300 is a high speed train (HST) mode, shown with the train graphic. As the UE 310 travels, serving cells may become available and other serving cells may become unavailable, where the availability/unavailability depends on the UE's 210 travel speed. Carrier aggregation may be desired such that the UE 310 can be provided a target throughput as it travels. If the UE 310 supports carrier aggregation in the high speed mode 300 (such as FR1 CA in HST, with a travel speed up to five-hundred Kph and a carrier frequency up to 3.6 GHz), the network (e.g., a gNB and/or an RNC) can configure and/activate particular serving cells for the UE 310.

Different configurations of the serving cells are possible. In one example, collocated cells 320 are configured (shown in FIG. 12 as two serving cells: Cell A and Cell B, although a larger number of collocated serving cells is possible). Collocated cells refers to serving cells having coverage in a same geographic area. For example, the gNBs of these serving cells can be physically collocated or can be even one gNB. The collocated serving cells 320 can use intra-band CCs and/or inter-band CCs.

In another example, a non-collocated cell 330 can be additionally or alternatively configured. The non-collocated cell 330 refers to a serving cell that is not collocated with another serving cell (such as not being collocated with Cell A or Cell B). The non-collocated cell 330 and the other serving cell can use intra-band CCs or inter-band CCs.

In yet another example, an intra-band cell 340 may be configured. The intra-band cell 340 refers to a serving cell that uses a component carrier within a same frequency band of a component carrier of another configured serving cell (such as Cell A or Cell B). The intra-band cell 340 and the other serving cell can be collocated or non-collocated.

In a further another example, an inter-band cell 350 may be configured. The inter-band cell 350 refers to a serving cell that uses a component carrier within a different frequency band of a component carrier of another configured serving cell (such as Cell A or Cell B). The inter-band cell 350 and the other serving cell can be collocated or non-collocated.

The specific configuration (e.g., collocated, non-collocated, intra-band, and/or inter-band) can depend on the capability of the UE 310 to support carrier aggregation in the high speed mode 300. This capability can be signaled by the UE 310 to the network via UE capability information. Additionally or alternatively, the capability can be pre-defined in a requirement that the UE 310 needs to meet, such as a requirement in a technical specification.

Once the specific configuration is defined (e.g., via an RRC connection reconfiguration), the UE can activate one or more of the configured serving cells. This activation can also depend on the UE's 310 to support carrier aggregation in the high speed mode 300. Further, the activation can be triggered by a MAC CE. Alternatively or additionally, the activation can be direct upon a serving cell being added to the configuration (e.g., via the RRC connection reconfiguration), where "direct activation" refers to relying on the RRC connection reconfiguration, rather than a MAC CE, as the trigger for the activation.

In an example, the high speed mode 300 is an HST mode for FR1 up to a 3.6 GHz frequency. In a NR network, an SCell activation and an SCell deactivation necessitate monitoring and measurements including, for instance, primary synchronization signal (PSS) and secondary synchronization signal (SSS) detecting, time index detection, and a measurement period for an activated SCell and/or a deactivated SCell. Particular activation and deactivation delays may also need to be met. Since HST UE has high speed (up to five-hundred Kph), the mobility performance is relatively more important than legacy UEs (e.g., non-HST operational mode). Delay for Legacy FR1 SCell activation is defined, for instance, in 3GPP TS 38.133 V16.5.0 (2020-09), section 8.3.2: "Upon receiving SCell activation command in slot n, the UE shall be capable to transmit valid CSI report and apply actions related to the activation command for the SCell being activated no later than in slot n+

$$\frac{T_{HARQ} + T_{activation\_time} + T_{CSI\_Reporting}}{NR \text{ slot length}},$$

where:
  $T_{HARQ}$ (in ms) is the timing between DL data transmission and acknowledgement as specified in TS 38.213 [3]
  $T_{activation\_time}$ is the SCell activation delay in millisecond. If the SCell is known and belongs to FR1, $T_{activation\_time}$ is:
  $T_{FirstSSB}$+5 ms, if the SCell measurement cycle is equal to or smaller than 160 ms.
  $T_{FirstSSB\_MAX}$+$T_{rs}$+5 ms, if the SCell measurement cycle is larger than 160 ms.
  If the SCell is unknown and belongs to FR1, provided that the side condition Ês/Iot≥2 dB is fulfilled, $T_{activation\_time}$ is:
  $T_{FirstSSB\_MAX}$+$T_{SMTC\_MAX}$+2*$T_{rs}$+5 ms."

In the above requirement, $T_{FirstSSB}$ relates to time/frequency (T/F) tracking, $T_{FirstSSB\_MAX}$ relates to antenna gain control (AGC) settling, and $T_{rs}$ relates to cell identification and T/F tracking. If the same or similar activation procedure is followed for SCell activation in the HST mode, the total delay of the SCell activation would be relatively long and can impact the UE's 310 mobility performance. Unless the UE 310 has improved monitoring and measurement capability relative to a legacy UE, reducing the SCell activation delay may involve enhancements from both the UE and network perspectives and/or enhancements to the UE capability indication. For instance, the particular number of component carriers for FR1 CA in HST can be determined in order to reduce the SCell activation delay. The UE 310 may only need to measure intra-frequency neighbour cell on selected serving component carriers. The deployment of the carrier aggregation may also consider whether to use collocated or non-collocated serving cells. Further, a new activation mechanisms, corresponding to a new UE capability to support CA for HST, may be used to support RRC-based activation during SCell addition and/or activation during handover. These and other enhancements are further described in the next figures.

Figure 4:
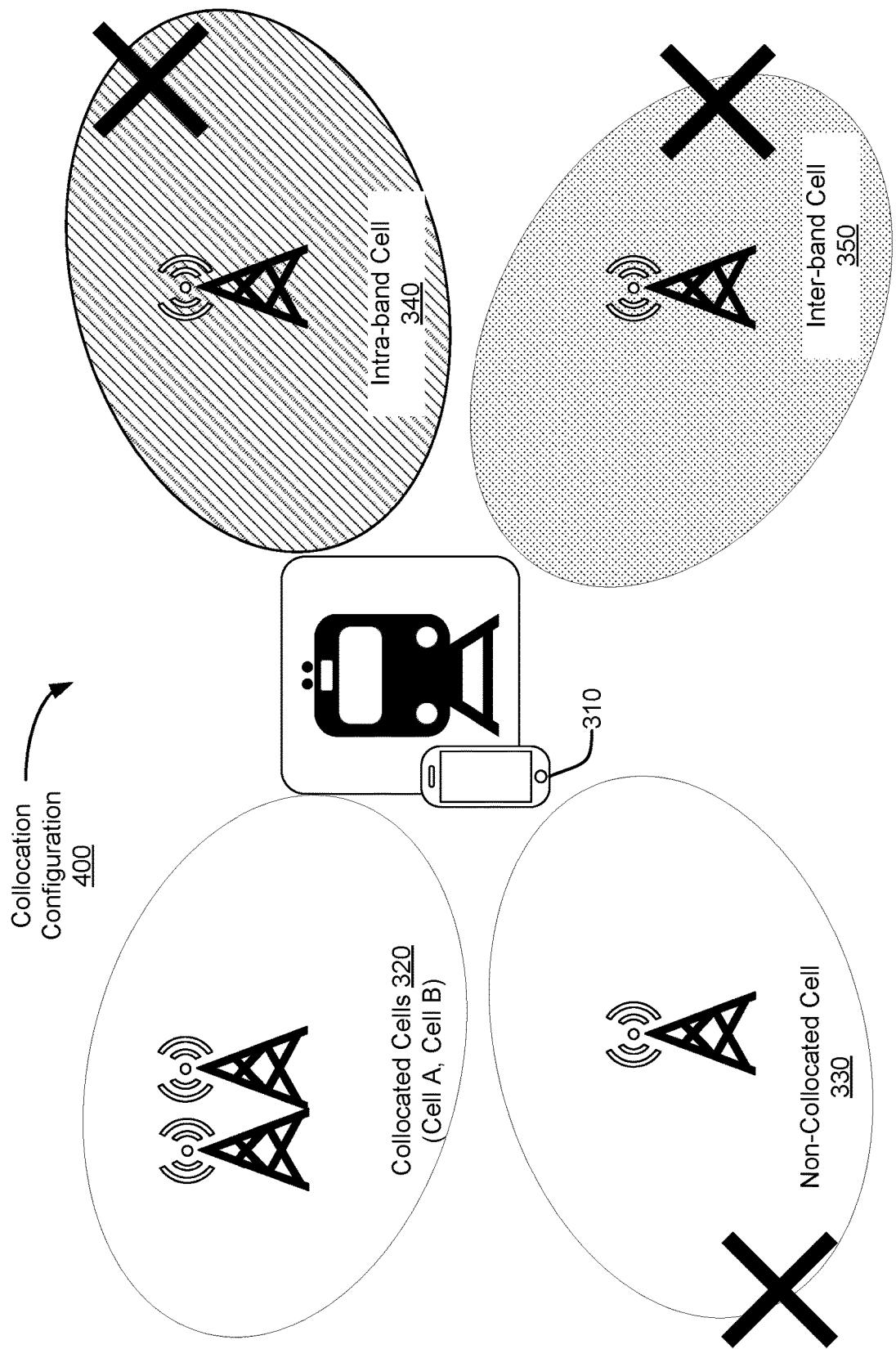
FIG. 4 illustrates an example of a collocation configuration for carrier aggregation, in accordance with some embodiments.

FIG. 4 illustrates an example of a collocation configuration 400 for carrier aggregation, in accordance with some embodiments. Here, out of the various possible carrier aggregation configurations described in connection with FIG. 3, the network may configure carrier aggregation for the high speed mode 300 (e.g., FR1 CA for HST) for only collocated cases. In other words, in the collocation configuration 400, the serving cells that are configured for carrier aggregation (or serving component carriers in HST FR1) are collocated. FIG. 4 illustrates this configuration with an X-marks over the non-collocated cell 330, the intra-band cell 340, and the inter-band cell 350. The collocated cells 320 are added to the carrier aggregation configuration for the UE 310.

In an example, the collocation configuration 400 is pre-defined as a requirement in a technical specification. No signaling may be needed from the UE 310 to indicate its capability for carrier aggregation in the high speed mode 300. Instead, the network only configures collocated serving cells (or serving component carriers) and the UE 310 may assume that only collocated serving cells (or serving component carriers) were configured. In another example, the signaling is used where, for instance, the UE 310 sends UE capability information indicating whether it can only support collocated serving cells for the carrier aggregation in the high speed mode 300. If that is the case, the network only may only provide the collocation configuration 400. In both examples, during the SCell activation procedure, relative to a non-collocated deployment, the collocated serving cells 320 may have more similar channel conditions, such that the complexity of the UE implementation can be reduced by taking advantage of the similarities. For example, the Doppler shift may be estimated for one serving cell. Given the collocation of the serving cells, this Doppler shift estimation may be reused for another collocated serving cell that is being activated (e.g., in the time compensation of the Doppler effect in the other collocated serving cell). By reusing the Doppler shift estimation, the total duration of the SCell activation procedure may be reduced.

Figure 5:
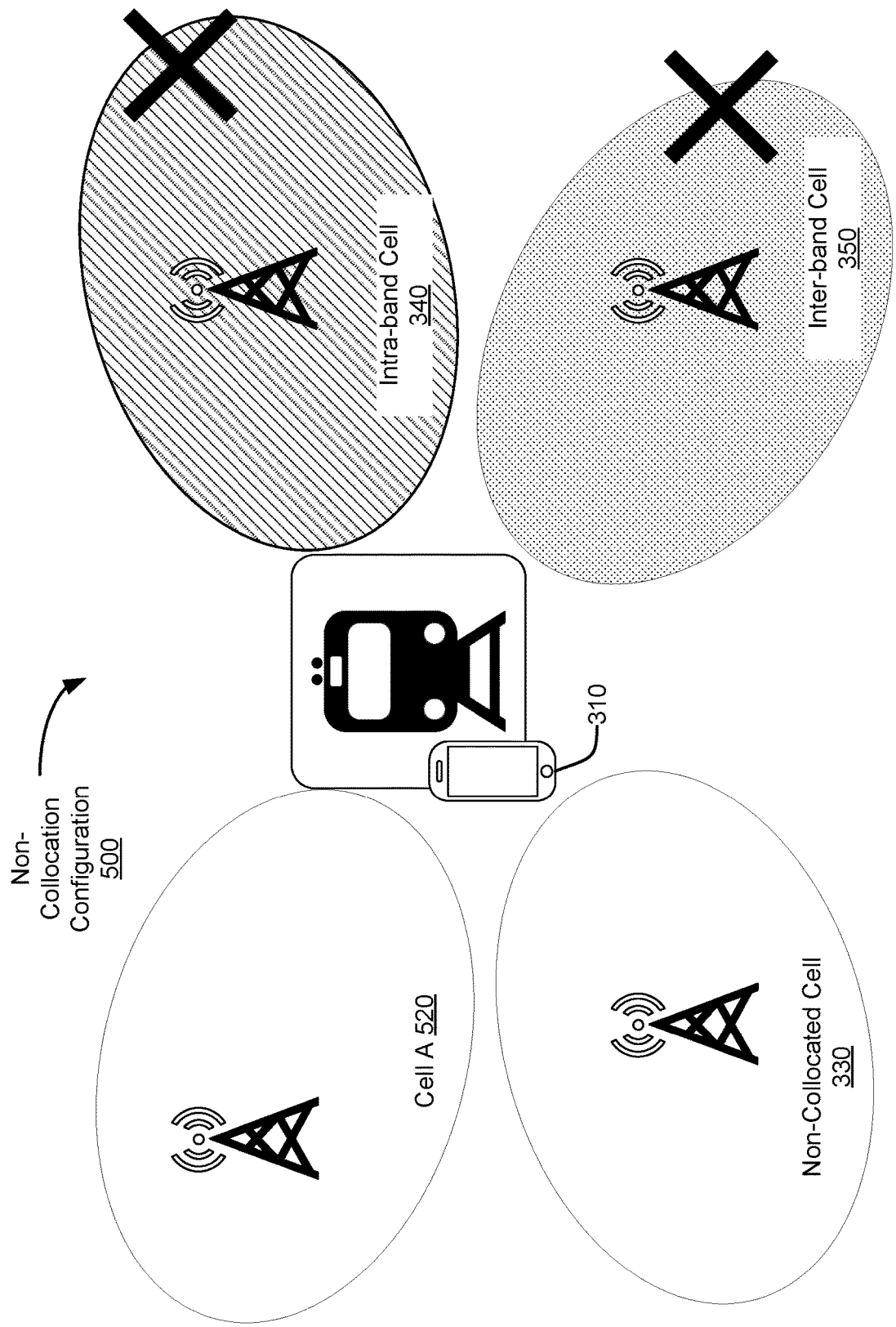
FIG. 5 illustrates an example of a non-collocation configuration for carrier aggregation, in accordance with some embodiments.

FIG. 5 illustrates an example of non-collocation configuration 500 for carrier aggregation, in accordance with some embodiments. Here, out of the various possible carrier aggregation configurations described in connection with FIG. 3, the network may configure carrier aggregation for the high speed mode 300 (e.g., FR1 CA for HST) using non-collocated serving cells (in addition to or in lieu of collocated serving cells). In other words, at least one serving cell that is being activated for the carrier aggregation is not collocated with another serving cell that the UE 310 uses. FIG. 5 illustrates this configuration with an X-marks over the intra-band cell 340 and the inter-band 350 and by removing Cell B. The non-collocated serving cells that are configured for the carrier aggregation in the high speed mode 300 are Cell A (shown with element number 520) and the non-collocated cell 330.

In an example, signaling may be needed from the UE 310 to indicate its capability for carrier aggregation in the high speed mode 300, where this capability supports non collocated deployment (or non-collocated and collocated deployment) for, for instance, FR1 CA in HST. In particular, the UE 310 can send UE capability information indicating whether it can support collocated or non-collocated serving cells for the carrier aggregation in the high speed mode 300. In turn, the network may configure the carrier aggregation according to the indicated capability.

Figure 6:
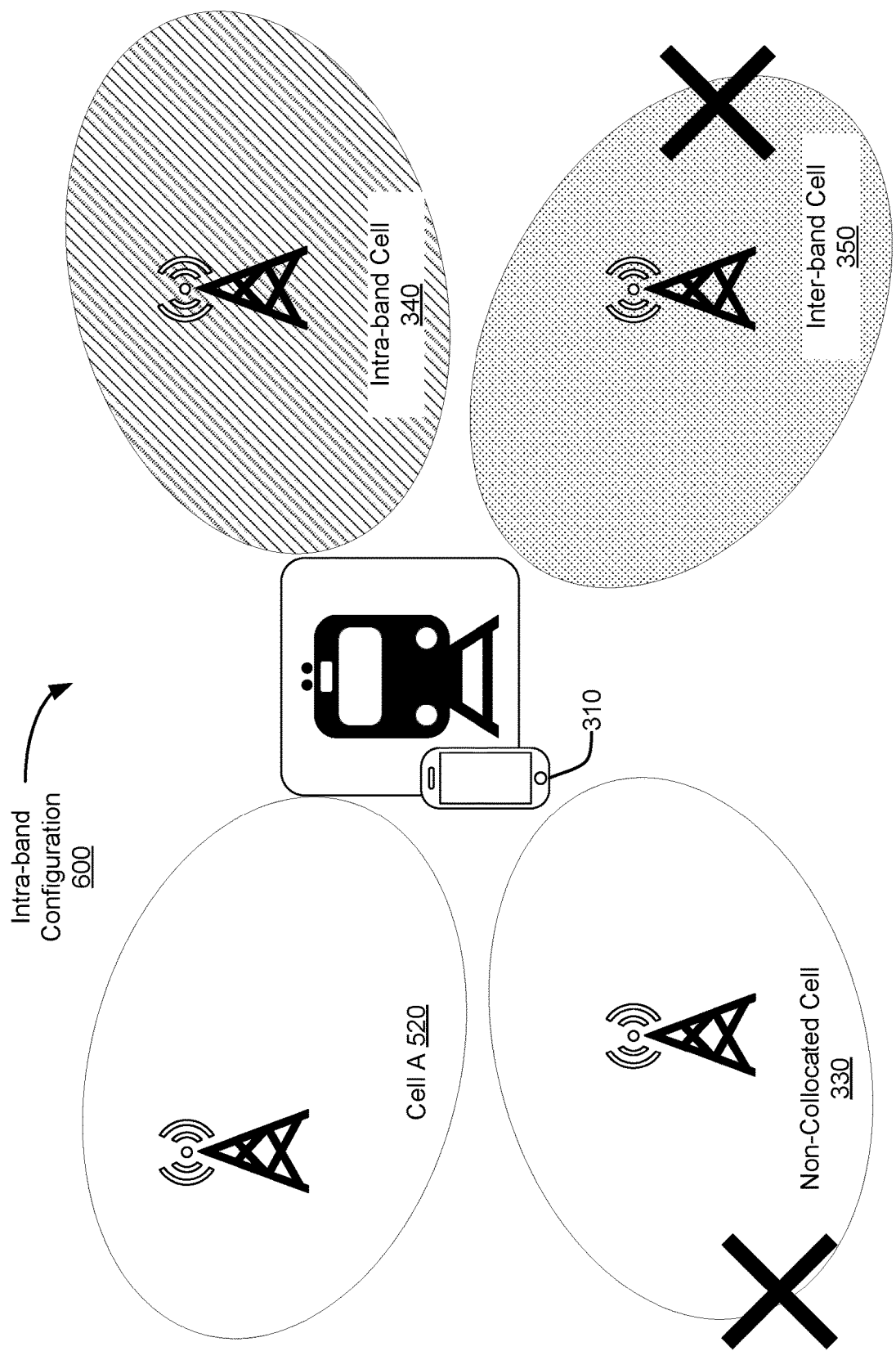
FIG. 6 illustrates an example of an intra-band configuration for carrier aggregation, in accordance with some embodiments.

FIG. 6 illustrates an example of intra-band configuration 600 for carrier aggregation, in accordance with some embodiments. Here, out of the various possible carrier aggregation configurations described in connection with FIG. 3, the network may configure carrier aggregation for the high speed mode 300 (e.g., FR1 CA for HST) using intra-band component carriers. In other words, in the collocation configuration 600, the serving cells that are configured for carrier aggregation use component carriers that are in a same frequency band. The component carriers can be contiguous or non-contiguous. FIG. 6 illustrates this configuration with an X-marks over the non-collocated cell 330 and the inter-band 350 and by removing Cell B. The intra-band component carriers are used by the Cell A 520 and the intra-band cell 340. These two cells 520 and 340 (e.g., identifies of these cells) are added to the carrier aggregation configuration information.

In an example, the intra-band configuration 600 is predefined as a requirement in a technical specification. No signaling may be needed from the UE 310 to indicate its capability for carrier aggregation in the high speed mode 300. Instead, the network only configures intra-band component carriers (more specifically, intra-band contiguous component carriers and/or intra-band non-contiguous component carriers as defined in the technical specification) and the UE 310 may assume that only serving (continuous and/or non-contiguous, as applicable) component carriers in the same band were configured. In another example, the signaling is used where, for instance, the UE 310 sends UE capability information indicating whether it can only support intra-band component carriers (intra-band contiguous component carriers and/or intra-band non-contiguous component carriers) for carrier aggregation in the high speed mode 300. If that is the case, the network only may only provide the intra-band configuration 400. In both examples, during the SCell activation procedure, relative to an inter-band deployment, the intra-band component carriers may have more similar properties, such that the complexity of the UE implementation can be reduced by taking advantage of the similarities. For example, the AGC may be estimated for one serving component carrier. Given that they belong to a same frequency band, the AGC estimation can be scaled for another intra-band component carrier of a serving cell that is being activated. For instance, if the two component carriers are contiguous and have the same bandwidth, the AGC estimation can be reused. If the two component carriers are contiguous, but have different bandwidths, the AGC estimation can be scaled up or down depending on the ratio of the bandwidths. By reusing the AGC estimation, the total duration of the SCell activation procedure may be reduced.

Figure 7:
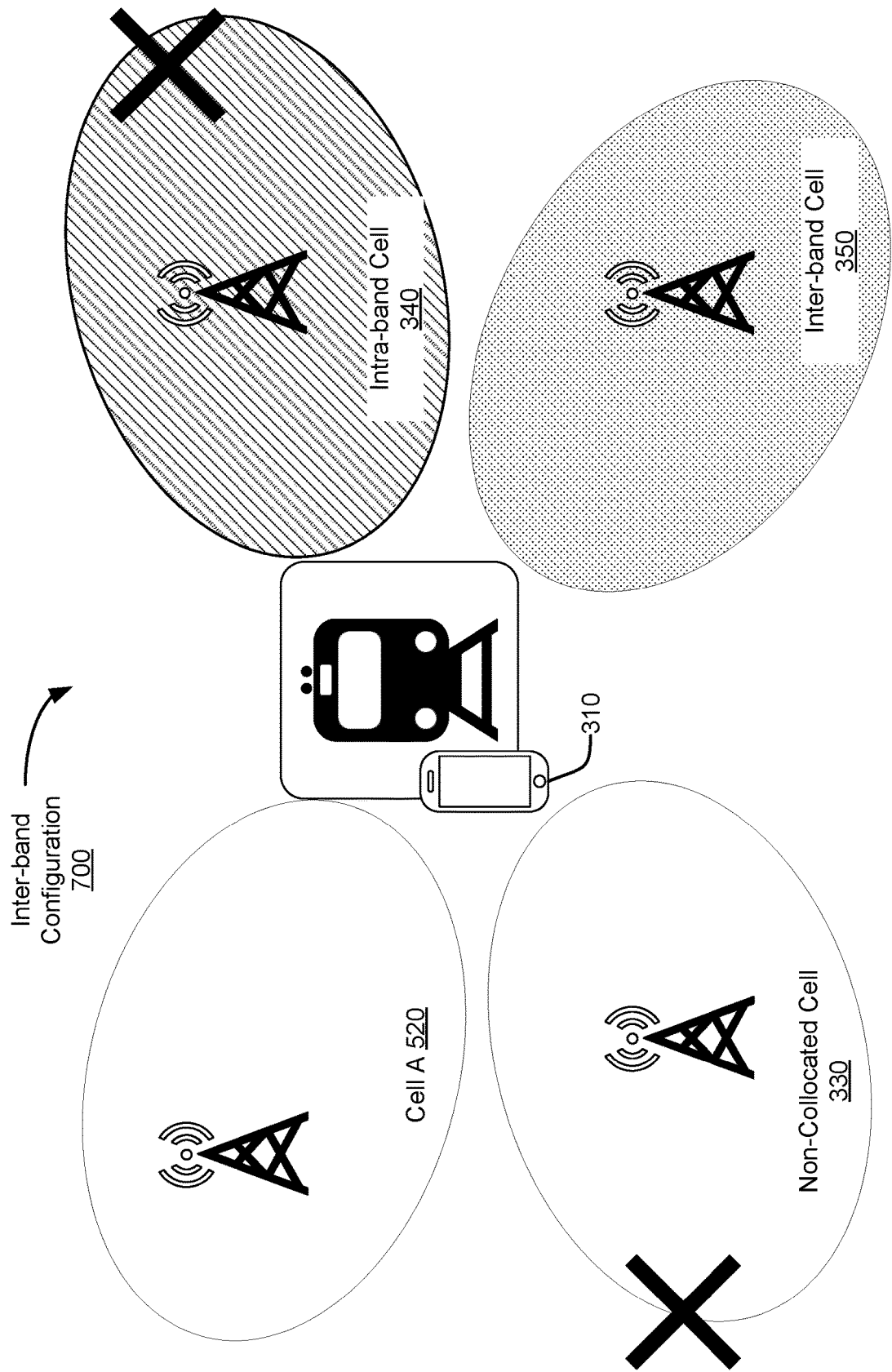
FIG. 7 illustrates an example of an inter-band configuration for carrier aggregation, in accordance with some embodiments.

FIG. 7 illustrates an example of inter-band configuration 700 for carrier aggregation, in accordance with some embodiments. Here, out of the various possible carrier aggregation configurations described in connection with FIG. 3, the network may configure carrier aggregation for the high speed mode 300 (e.g., FR1 CA for HST) using inter-band component carriers. In other words, in the collocation configuration 700, the serving cells that are configured for carrier aggregation use component carriers that are in different frequency bands. FIG. 7 illustrates this configuration with an X-marks over the non-collocated cell 330 and the intra-band 340 and by removing Cell B. The inter-band component carriers are used by the Cell A 520 and the inter-band cell 350. These two cells 520 and 350 (e.g., identifies of these cells) are added to the carrier aggregation configuration information.

In an example, signaling may be needed from the UE 310 to indicate its capability for carrier aggregation in the high speed mode 300, where this capability supports inter-band component carriers (or inter-band and intra-band component carriers) for, for instance, FR1 CA in HST. In particular, the UE 310 can send UE capability information indicating whether it can support inter-band component carriers, intra-band contiguous component carriers, or intra-band non-contiguous component carriers for the carrier aggregation in the high speed mode 300. In turn, the network may configure the carrier aggregation according to the indicated capability.

The example configurations of FIG. 4-7 are provided for illustrative purposes. Each of these configurations can be used independently of the other configurations. Alternatively or additionally, combinations of some or all of these configurations can be used. A combination can be defined in a technical specification or can depend on signaling from the UE 310 indicating its capability to support the combination in the high speed mode 300. For instance, inter-band component carriers may be only assumed (e.g., defined in the technical specification) together with a collocated deployment for FR1 CA in the HST. In this case, the network may configure and the UE 301 may expect inter-band FR1 CA for HST only if those inter-band component carriers are collocated. In another illustration, the UE 310 indicates its capability to support inter-band FR1 CA for HST when those inter-band CCs are collocated and the network configures the CA aggregation accordingly. Or the UE 310 indicates its capability to support inter-band FR1 CA for HST when those inter-band CCs are non-collocated and the network configures the CA aggregation accordingly.

Other variations are also possible. For instance, an SCell activation delay can be reduced by reducing the number of serving cells that can be activated and/or that can be configured for subsequent or direct activation. In an example, a maximum number of serving cells (or, similarly, serving component carriers) for carrier aggregation in the high speed mode 300 may be defined in a technical specification. This number can be smaller than the maximum number in legacy carrier aggregation (e.g., FR1 CA). For instance, the number is smaller than eight. The network may follow this upper bound to implement the carrier aggregation for the UE 310 in the high speed mode 300. And the UE 310 may not expect more than this upper bound of serving cells to be configured and activated for carrier aggregation in the high speed mode 300. In another example, signaling is used, whereby the UE 310 indicates to the network the maximum number of serving cells (or, similarly, serving component carriers) that the UE 310 can support for carrier aggregation in the high speed mode 300. The network configures and/or commands the UE to activate the serving cells accordingly.

In another variation, the band combination (BC) of component carriers may be additionally or alternatively used. In one example of this variation, the UE 310 may indicate its legacy BC capability to the network in, for instance, UE capability information. When configuring the carrier aggregation in the high speed mode 300, the network can configure serving cells that have component carriers according to the legacy BC capability. In another example, the UE 310 may additionally indicate its BC capability specific to the high speed mode 300. In this example, the network can configure serving cells that have component carriers according to this high speed mode-specific BC capability.

Once the carrier aggregation in the high speed mode 300 has been configured for the UE 310 and includes multiple serving cells, additional enhancements may be performed to reduce the SCell activation delay. In one example, upon receiving a MAC CE element to start an SCell activation procedure or upon a direct SCell activation procedure (e.g., no MAC CE used), the UE 310 may select a subset of the serving cells for activation (or, similarly, a subset serving component carriers). Measurements, such as intra-frequency measurements, can be performed on the selected serving cells (or, similarly, the selected serving component carriers). The primary component carrier is typically selected. Additionally, one or more secondary component carriers that have been configured with intra-frequency measurement objects can be selected randomly or based on cell/component carrier indexes in an ascending or descending order. Conversely, for the set of serving cells (or, similarly, serving components), the network may select a subset for which the network configures intra-frequency measurement objects. The selection can be random or follow an ascending or descending cell/component carrier index. The primary component carrier is typically configured with an intra-frequency measurement object. In this way, the network may indicate to the UE 310 that the primary component carrier is to be selected and, optionally, the secondary component carriers with the corresponding intra-frequency measurement objects can be selected.

The above examples can be used in conjunction. For instance, a collocated carrier aggregation may be configured. In this configuration, the total number of serving cells that can be activated is less than the maximum number predefined in a technical specification or indicated by the UE 310. The specific component carriers may be intra-band non-contiguous and belong to band combinations that the UE 310 supports. Some or all of these component carriers may be configured with intra-band measurement objects.

Figure 8:
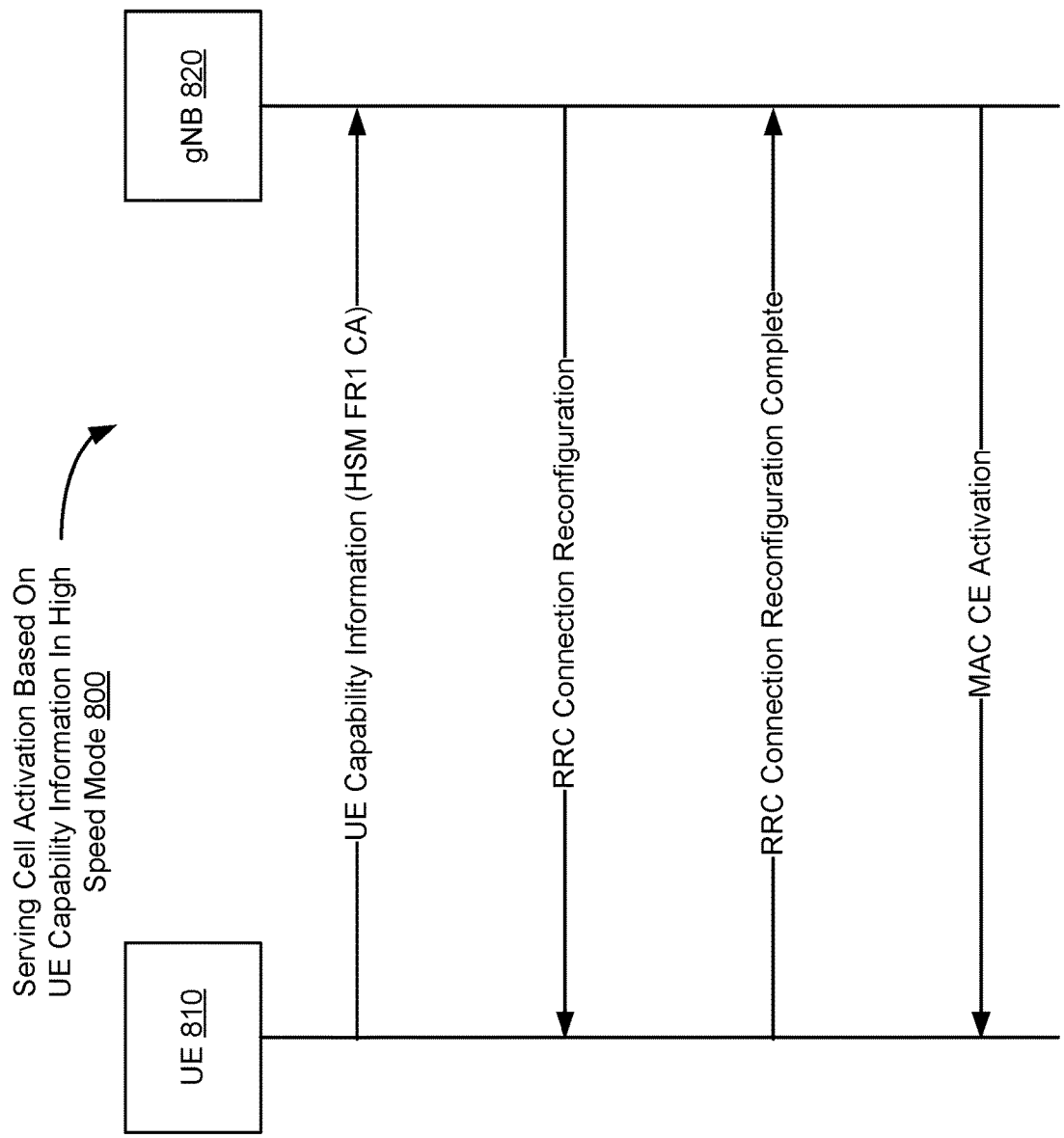
FIG. 8 illustrates an example of serving cell activation based on UE capability information in a high speed mode, in accordance with some embodiments.

FIG. 8 illustrates an example of serving cell activation based on UE capability information in a high speed mode 800, in accordance with some embodiments. UE 810 sends UE capability information for carrier aggregation in a high speed mode to a gNB 820. In turn, the gNB 820 configures the carrier aggregation for the UE in the high speed mode based on the UE capability information. Configuring the carrier aggregation may include adding serving cells for use in the carrier aggregation, where the addition identifies the serving cells and can be carried via a RRC connection reconfiguration, as described in connection with FIG. 2. One or more of these serving cells can be subsequently activated via a MAC CE element.

In an example, the UE capability information uses an IE that is specific to indicating the UE's capability for supporting carrier aggregation in the high speed mode. This IE can be sent in addition to other IEs indicating the UE's 810 for supporting carrier aggregation and/or band combination in a legacy mode (e.g., a non-high speed mode). Alternatively, the same IE can be used, where, for instance, the UE 810 indicates its BC legacy combination in an IE and the gNB 820 uses this IE to also configure the carrier aggregation in the high speed mode. The capability information indicated for carrier aggregation in the high speed mode can include any or a combination of: the supported band combinations, the supported maximum number of serving cells (or, similarly, serving component carriers), whether intra-band contiguous component carriers are supported, whether intra-band non-contiguous component carriers are supported, whether inter-band component carriers are supported, whether collocated serving cells are supported, and/or whether non-collocated serving cells are supported. In the case when none of such capability information is signaled to the base station 820, the base station 820 may assume (e.g., based on a requirement specified in a technical specification) a minimum set of capabilities (e.g., the maximum number of component carriers is smaller than eight, the band combination is the same as the legacy mode, intra-band contiguous component carriers in collocated serving cells are supported).

Figure 9:
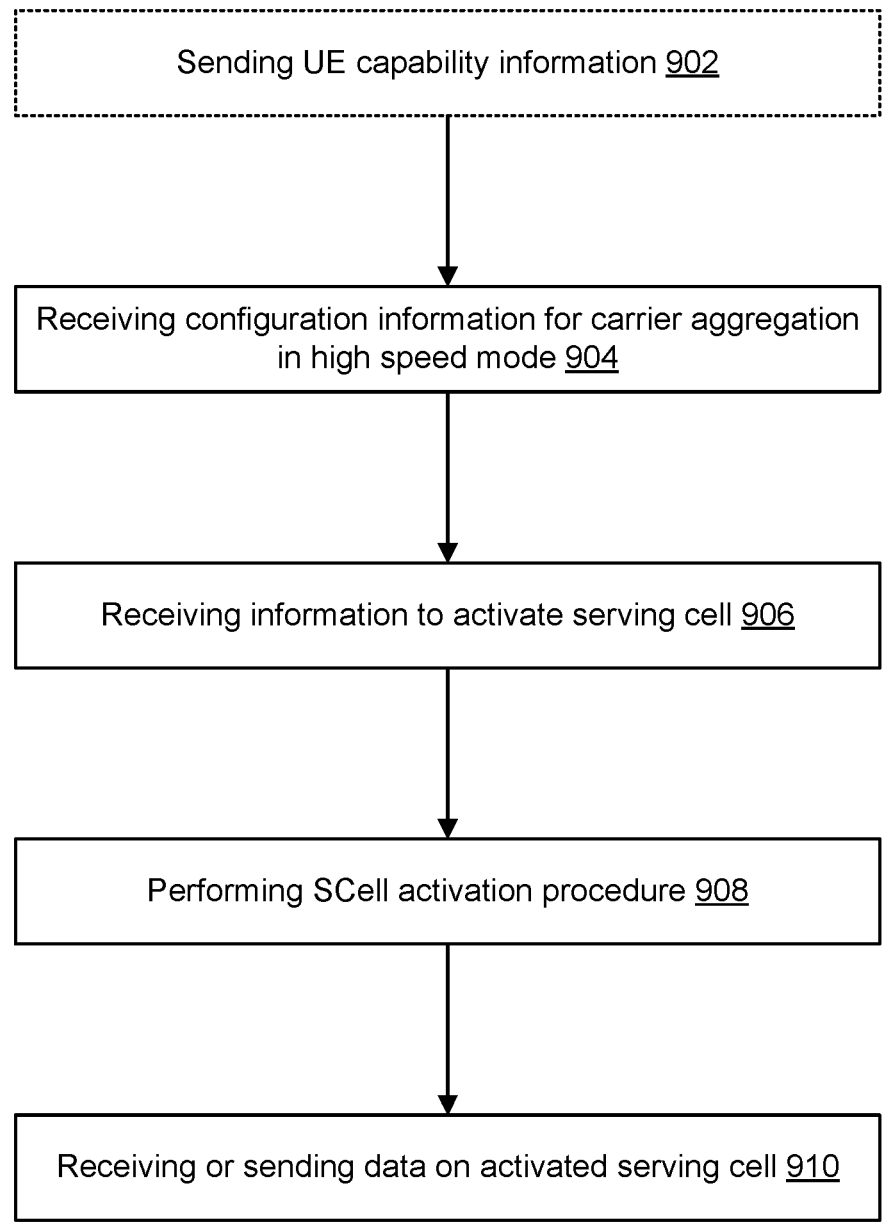
FIG. 9 illustrates an example of an operational flow/algorithmic structure for performing carrier aggregation in a high speed mode, in accordance with some embodiments.

FIG. 9 illustrates an example of an operational flow/algorithmic structure 900 for performing carrier aggregation in a high speed mode, in accordance with some embodiments. A UE can implement the operational flow/algorithmic structure 900 to improve an SCell activation procedure in the high speed mode. The operational flow/algorithmic structure 900 may be performed or implemented by the UE, such as, for example, the UE 104, 1500, or components thereof, for example, processors 1504. The UE can communicate with a base station, such as a gNB. Nonetheless, the communication can similarly involve or be directed to a network that may include the base station and/or an RNC.

The operation flow/algorithmic structure 900 may include, at 902, sending, to the base station, UE capability information. In some embodiments, the UE capability information indicates a set of capabilities that the UE supports for carrier aggregation in support of the high speed mode as described in connection with FIG. 9. The UE capability information can be sent in an IE specific to the carrier aggregation for the high speed mode or can be included in another IE sent for other purposes (e.g., a legacy IE that can be augmented with the information about the supported set of capabilities). In some other embodiments, the UE capability information may not be sent. Instead, the network may assume a particular set of capabilities that the UE supports for carrier aggregation in the high speed mode. In addition, legacy UE capability information, such as the UE's legacy band combination capability, may be send by the UE and used by the network in configuring the carrier aggregation in the high speed mode.

The operation flow/algorithmic structure 900 may include, at 904, receiving, from the base station, configuration information for the carrier aggregation in the high speed mode. In some embodiments, the configuration information is generated based on the UE capability information that was sent at operation 902. In some other embodiments, when no such UE capability is sent, the configuration information is generated based on the assumed capabilities for carrier aggregation in the high speed mode and, optionally as applicable, legacy band combination capabilities. In the various embodiments, the configuration information corresponds to serving cell addition in an RRC connection reconfiguration. The configuration information may indicate the set of serving cells that are added for the UE for the carrier aggregation. At least one of the size of the set, a location of a serving cell that is indicated in the set (e.g., whether collocated or non-collocated with other serving cell(s)), or a component carrier of the serving cell (e.g., whether in a same frequency band and contiguous with another serving component carrier, in a same frequency band and non-contiguous with another serving component carrier, or in a different frequency band than another serving component carrier) is based on the high speed mode of the UE and, more specifically, is based on signaled or assumed capability of the UE to support carrier aggregation in the high speed mode.

The operation flow/algorithmic structure 900 may include, at 906, receiving, from the base station, information to activate one or more serving cells. The serving cells corresponds to the set of serving cells that are indicated in the configuration information. In some embodiments, the information includes a MAC CE with a bitmap that identifies the serving cells that are to be activated.

The operation flow/algorithmic structure 900 may include, at 908, performing an SCell activation procedure based on the information. In some embodiments, at least one of the serving cells is activated. In other embodiments, all of the serving cells indicated for activation by the bitmap are activated. In yet other embodiments, more than one and up to all of the serving cells indicated for the activation by the bitmap are activated. For instance, the UE can select (randomly or otherwise) a subset of the serving cells that have been configured with intra-frequency measurement objects and performs the activation procedure for only this subset.

The operation flow/algorithmic structure 900 may include, at 910, receiving or sending data on an activated serving cell. In some embodiments, the activated serving cell provides a PDSCH or PDCCH, where the UE receives traffic data or control over the PDSCH or PDCCH, respectively. In other embodiments, the activated serving provides a PUSCH, where the UE sends traffic data over the PUSCH.

Figure 10:
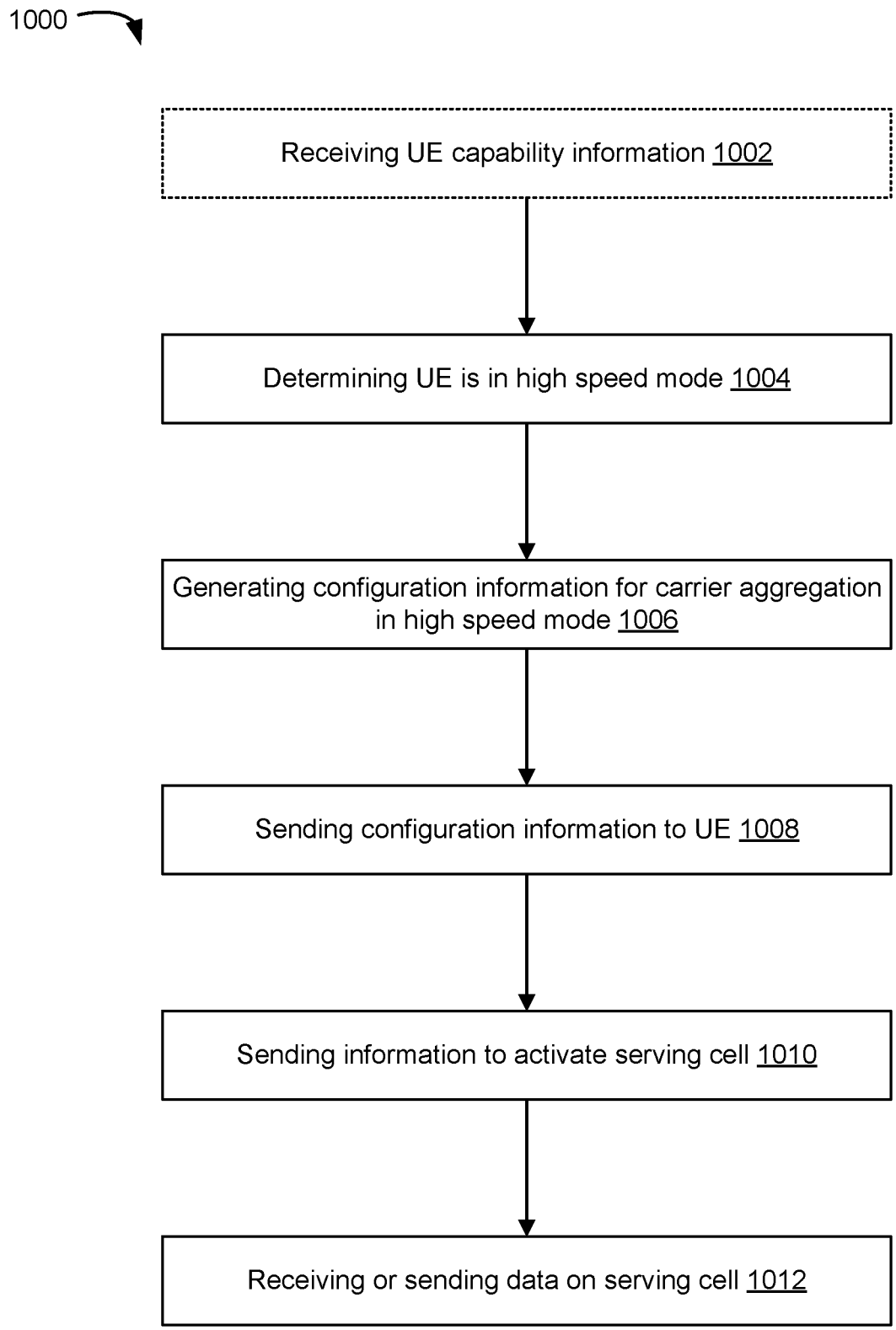
FIG. 10 illustrates another example of an operational flow/algorithmic structure for performing carrier aggregation in a high speed mode, in accordance with some embodiments.

FIG. 10 illustrates another example of an operational flow/algorithmic structure 1000 for performing carrier aggregation in a high speed mode, in accordance with some embodiments. A base station can implement the operational flow/algorithmic structure 1000 to avoid, for instance, configuring carrier aggregation and activating serving cells for a UE in the high speed mode. The operation flow/algorithmic structure 1000 may be performed or implemented by the base station, such as, for example, the gNB 108, 1600, or components thereof, for example, processors 1604. Additionally or alternatively, the operation flow/algorithmic structure 1000 may be similarly performed or implemented by a network that may include the base station and/or an RNC.

The operation flow/algorithmic structure 1000 may include, at 1002, receiving, from the UE, UE capability information. In some embodiments, the UE capability information indicates a set of capabilities that the UE supports for carrier aggregation in support of the high speed mode as described in connection with FIG. 9. The UE capability information can be sent in an IE specific to the carrier aggregation for the high speed mode or can be included in another IE sent for other purposes (e.g., a legacy IE that can be augmented with the information about the supported set of capabilities). In some other embodiments, the UE capability information may not be received. Instead, the base station may assume a particular set of capabilities that the UE supports for carrier aggregation in the high speed mode. In addition, legacy UE capability information, such as the UE's legacy band combination capability, may be received from the UE and used by the base station in configuring the carrier aggregation in the high speed mode.

The operation flow/algorithmic structure 1000 may include, at 1004, determining that the UE is in the high speed mode (e.g., the UE's current operational mode is the high speed mode). In some embodiments, this determination may rely on static information. For instance, the configuration of the base station may include a flag set to indicate that the base station itself is associated with the high speed mode. Accordingly, the base station can assume that the connection with the UE corresponds to the UE being in the high speed mode. In other embodiments, this determination may rely on dynamic information. Different types of dynamic information are possible. In an example, the travel speed may be determined by the base station or by the UE that then indicates it to the base station. If the travel speeds is larger than a speed threshold of the high speed mode, the base station can determine that the UE is in the high speed mode. In another example, the UE can include a selectable user setting that sets the operational mode of the UE to be the high speed mode. In this example, upon a user selection of this setting, the base station may receive an indication from the UE that the UE is in the high speed mode.

The operation flow/algorithmic structure 1000 may include, at 1006, generating configuration information for carrier aggregation in the high speed mode. In some embodiments, the configuration information is generated based on the UE capability information that was received at operation 1002. In some other embodiments, when no such UE capability is received, the configuration information is generated based on the assumed capabilities for carrier aggregation in the high speed mode and, optionally as applicable, legacy band combination capabilities. In the various embodiments, the configuration information corresponds to serving cell addition in an RRC connection reconfiguration.

The operation flow/algorithmic structure 1000 may include, at 1008, sending the configuration information to the UE. In some embodiments, the configuration information is sent in an RRC message that corresponds to the RRC connection reconfiguration. The configuration information may indicate the set of serving cells that are added for the UE for the carrier aggregation. At least one of the size of the set, a location of a serving cell that is indicated in the set (e.g., whether collocated or non-collocated with other serving cell(s)), or a component carrier of the serving cell (e.g., whether in a same frequency band and contiguous with another serving component carrier, in a same frequency band and non-contiguous with another serving component carrier, or in a different frequency band than another serving component carrier) is based on the high speed mode of the UE and, more specifically, is based on signaled or assumed capability of the UE to support carrier aggregation in the high speed mode.

The operation flow/algorithmic structure 1000 may include, at 1010, sending information to activate one or more serving cells. The serving cells correspond to the set of serving cells that are indicated in the configuration information. In some embodiments, the information includes a MAC CE with a bitmap that identifies the serving cells that are to be activated. Further, the base station can select (randomly or otherwise) a subset from the set for the activation and can indicate this subject in the bitmap. Additionally or alternatively, the base station can configure particular ones of the serving cells with intra-frequency measurement objects, such that the UE can activate some or all of these particular serving cells.

The operation flow/algorithmic structure 1000 may include, at 1012, receiving or sending data on a serving cell that has been activated. In some embodiments, the activated serving cell provides a PDSCH or PDCCH, where the base station (or another base station) sends traffic data or control over the PDSCH or PDCCH, respectively. In other embodiments, the activated serving provides a PUSCH, where the base station (or another base station) receives traffic data over the PUSCH.

Figure 11:
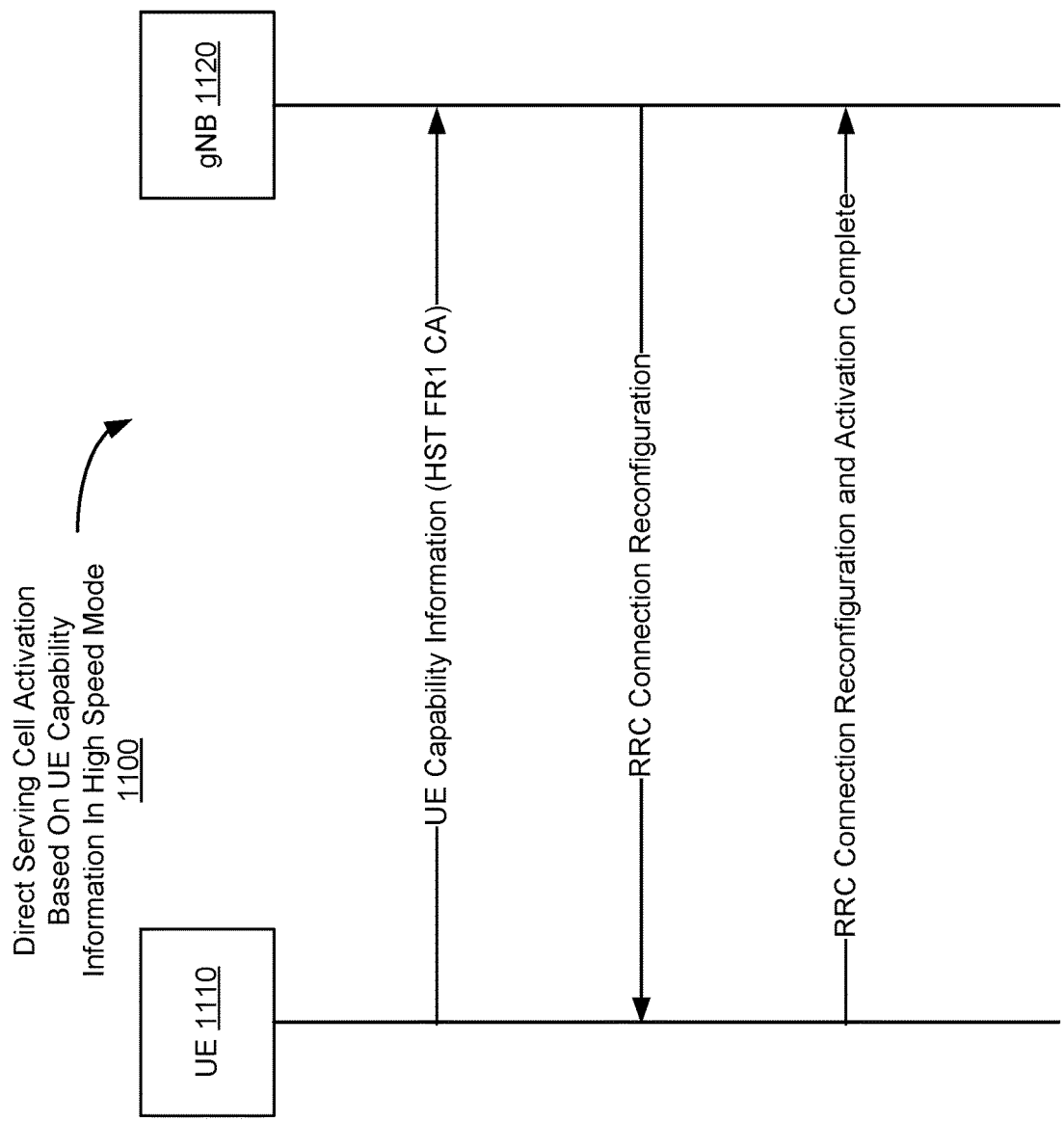
FIG. 11 illustrates an example of direct serving cell activation based on UE capability information in a high speed mode, in accordance with some embodiments.

FIG. 11 illustrates an example of direct serving cell activation based on UE capability information in a high speed mode 1100, in accordance with some embodiments. Here, direct refers to activating a serving cell automatically upon receiving a RRC connection reconfiguration message and absent of a MAC CE for the activation. The trigger for this direct activation is a UE's 1110 capability to support carrier aggregation in the high speed mode, where this capability is signaled to a base station 1120.

Generally, direct SCell activation during SCell addition based on RRC is defined in 3GPP TS38.133 V16.5.0 (2020-09), section 8.3.4: "The requirements in this clause apply for UE being configured in the RRC reconfiguration message, TS 38.331 [2], with one SCell for which the parameter sCellState is set to activated.

The UE shall configure the SCell in activated state upon successful completion of the RRC reconfiguration procedure within the specified delay. Upon receiving the RRC reconfiguration message in slot n, the UE shall be capable to transmit valid CSI report and apply actions for the directly activated SCell no later than in slot $$n + \frac{N_{direct}}{NR \text{ slot length}},$$

where:

$N_{direct} = T_{RRC\_Process} + T_1 + T_{activation\_time} + T_{CSI\_Reporting} - 3$ ms $T_{RRC\_Process}$: RRC procedure delay defined in clause 12 of TS 38.331 [2], $T_1$: Delay from slot $$n + \frac{T_{RRC\_Process}}{NR \text{ slot length}}$$

until the transmission of RRCConnectionReconfigurationComplete message,

Note: $T_1$ is UE implementation dependent.

$T_{activation\_time}$ and $T_{CSI\_Reporting}$ are specified in clause 8.3.2, where the following definitions of $T_{FirstSSB}$ and $T_{FirstSSB\_MAX}$ override the existing ones:

$T_{FirstSSB}$: the time to the end of the first complete SSB burst indicated by the SMTC after slot $$n + \frac{T_{RRC\_Process} + T_1}{NR \text{ slot length}}$$

$T_{FirstSSB\_MAX}$: the time to the end of the first complete SSB burst indicated by the SMTC after slot $$n + \frac{T_{RRC_{Process}} + T_1}{NR \text{ slot length}}$$

In FR1, in case of intra-band SCell activation, the occasion when all active serving cells and SCells being activated or released are transmitting SSB bursts in the same slot; in case of inter-band SCell activation, the first occasion when the SCell being activated is transmitting SSB burst.

In FR2, the occasion when all active serving cells and SCells being activated or released are transmitting SSB bursts in the same slot."

Further, direct SCell activation during handover is defined in 3GPP TS38.133 V16.5.0 (2020-09), section 8.3.5: "The requirements in this clause apply for UE being configured in the RRC reconfiguration message, TS 38.331 [2], for handover with one SCell for which the parameter sCellState is set to activated.

The UE shall configure the SCell in activated state upon successful completion of the RRC reconfiguration procedure within the specified delay. Upon receiving the RRC reconfiguration message in slot n, the UE shall be capable to transmit valid CSI report and apply actions for the directly activated SCell no later than in slot $$n + \frac{N_{direct}}{NR \text{ slot length}},$$

Where:

$N_{direct} = T_{RRC\_process} + T_{interrupt} + T_2 + T_3 + T_{activation\_time} + T_{CSI\_Reporting} - 3$ ms $T_{RRC\_Process}$: RRC procedure delay defined in clause 12 of TS 38.331 [2], $T_{interrupt}$: Interruption time during handover as specified in clause 6.1.1, $T_2$: Delay from slot $$n + \frac{T_{RRC\_Process} + T_{interrupt}}{NR \text{ slot length}}$$

until UE has obtained a valid TA command for the target PCell, $T_3$: Delay for applying the received TA for uplink transmission in the target PCell, and greater than or equal to k+1 slot, where k is defined in clause 4.2 in TS 38.213, $T_{activation\_time}$ and $T_{CSI\_Reporting}$ are specified in clause 8.3.2, where the following definitions of $T_{FirstSSB}$ and $T_{FirstSSB\_MAX}$ shall override the existing ones:

$T_{FirstSSB}$: the time to the end of the first complete SSB burst indicated by the SMTC after slot $$n + \frac{T_{RRC\_Process} + T_{interrupt} + T_2 + T_3}{NR \text{ slot length}}$$

$T_{FirstSSB\_MAX}$: the time to the end of the first complete SSB burst indicated by the SMTC after slot $$n + \frac{T_{RRC_{Process}} + T_{interrupt} + T_2 + T_3}{NR \text{ slot length}}$$

In FR1, in case of intra-band SCell activation, the occasion when all active serving cells and SCells being activated or released are transmitting SSB bursts in the same slot; in case of inter-band SCell activation, the first occasion when the SCell being activated is transmitting SSB burst.

In FR2, the occasion when all active serving cells and SCells being activated or released are transmitting SSB bursts in the same slot."

In the present disclosure, a similar direct SCell activation procedure can be used, except that the trigger for this direct SCell activation procedure is the UE's capability to support carrier aggregation in the high speed mode. For instance, any of the above requirements can apply when the UE signals this capability to the base station and upon an SCell addition based on RRC or an SCell activation during handover.

As illustrated in FIG. 11, the UE 1110 sends UE capability information to the gNB 1120 indicating that the UE 1110 supports carrier aggregation in the high speed mode (e.g., HST FR1 CA). The UE capability information can be similar to the one described in connection with FIG. 9. In turn, the network configures a set of serving cells for the carrier aggregation based on the UE capability information and sends this information as a per of the RRC connection reconfiguration. Upon receiving this RRC message, the UE 1110 executes the SCell addition command and automatically activates one or more of the serving cells.

Figure 12:
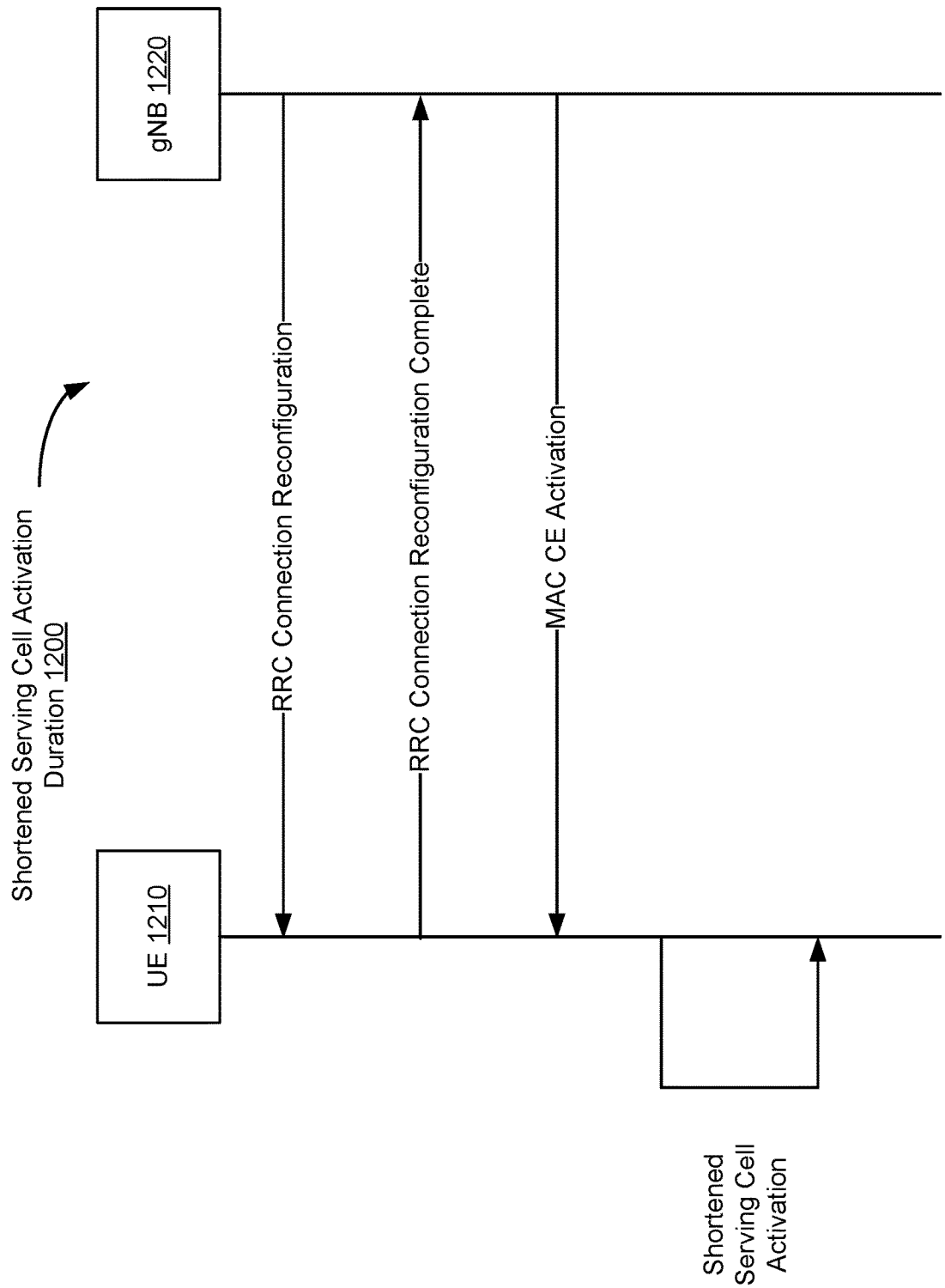
FIG. 12 illustrates an example of an activation procedure that uses a shortened serving cell activation duration, in accordance with some embodiments.

FIG. 12 illustrates an example of an activation procedure that uses a shortened serving cell activation duration 1200, in accordance with some embodiments. Here, the shortened serving cell activation duration 1200 is based on a UE's 1210 capability to support carrier aggregation in a high speed mode. The UE 1210 may, but need not, signal this capability to a gNB 1220. If signaled, the gNB 1220 may, but need not, configure serving cells for the carrier aggregation based on the UE capability information. In these various cases, during the SCell activation procedure, the UE can reduce its duration by reusing some information from one or more already activated serving cells in the activation of one or more other serving cells.

As illustrated, the UE 1210 receives a RRC connection reconfiguration message from the gNB 1220 indicating serving cells that are added for the carrier aggregation, executes the SCell addition command, and send a RRC connection reconfiguration complete message to the gNB 1220. Subsequently, the UE 1210 receives a MAC CE from the gNB 1220 to activate some or all of the serving cells. The UE 1210 proceeds with the SCell activation procedure, where some restrictions may be applied to shorten the activation delay. In an example, a restriction indicates that SCell activation for the high speed mode only applies when a synchronization signal block (SSB) measurement timing configuration (SMTC) of a target serving cell is below a certain time threshold. The time threshold can be equal to or smaller than eighty milliseconds or some other value defined in a technical specification. In another example, coarse cell timing information of a primary cell or an already activated SCell can be reused for the target serving cell that is being activated. In yet another example, the AGC estimation can be scaled from the PCell or the already activated SCell for the target SCell that is being activated. In this example, the UE can skip or shorten the AGC settling time for an unknown to-be-activated SCell or a known to-be-activated SCell with a particualr RRC parameter that controls the measurement requirement for this SCell (e.g., with measCycleSCell larger than one-hundred and sixty milliseconds). In a further example, the Doppler shift estimation from the PCell or the already activated SCell can be reused in the time compensation for the Doppler shift in the serving cell that is being activated when, for instance, the PCell or the already activated SCell is collocated with the target SCell.

Figure 13:
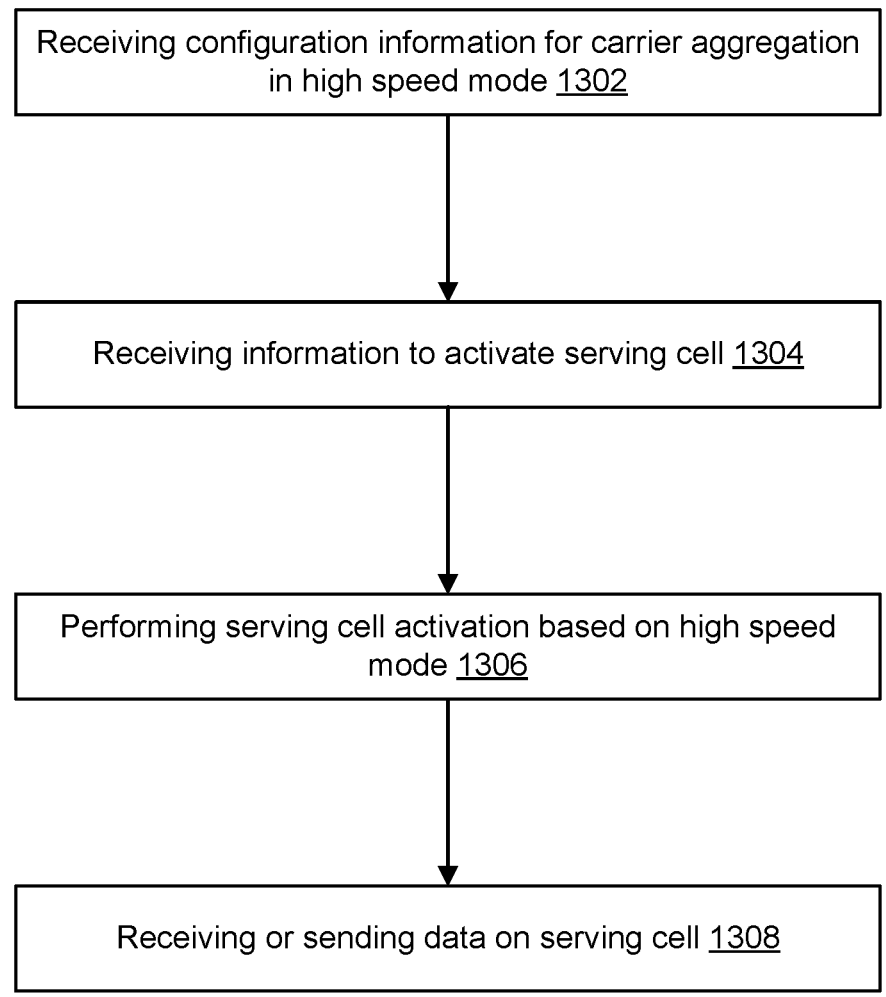
FIG. 13 illustrates another example of an operational flow/algorithmic structure for performing carrier aggregation in a high speed mode, in accordance with some embodiments.

FIG. 13 illustrates another example of an operational flow/algorithmic structure 1300 for performing carrier aggregation in a high speed mode, in accordance with some embodiments. A UE can implement the operational flow/algorithmic structure 1300 to shorten an SCell activation delay in the high speed mode. The operation flow/algorithmic structure 1300 may be performed or implemented by the UE, such as, for example, the UE 104, 1500, or components thereof, for example, processors 1504. The UE can communicate with a base station, such as a gNB. Nonetheless, the communication can similarly involve or be directed to a network that may include the base station and/or an RNC.

The operation flow/algorithmic structure 1300 may include, at 1302, receiving, from the base station, configuration information for carrier aggregation in the high speed mode. In some embodiments, the configuration information is generated based on UE capability information signaled by the UE to the base station about the UE's support and/or carrier aggregation capability in the high speed mode. In some embodiments, no such information is signaled to the base station and the configuration information is not generated accordingly. The configuration information corresponds to serving cell addition in an RRC connection reconfiguration. The configuration information may indicate the set of serving cells that are added for the UE for the carrier aggregation.

The operation flow/algorithmic structure 1300 may include, at 1304, receiving, from the base station, information to activate one or more serving cells. The serving cells correspond to the set of serving cells that are indicated in the configuration information. In some embodiments, the information includes a MAC CE with a bitmap that identifies the serving cells that are to be activated. In other embodiments that relate direct SCell activation, the configuration information is the same as the information to activate the one or more cells (e.g., operations 1302 and 1304 are the same and collapse into one operation).

The operation flow/algorithmic structure 1300 may include, at 1306, performing an SCell activation procedure based on the information and the high speed mode. In some embodiments, a trigger for the activation procedure or a duration of the activation procedure is based on a high speed mode of the UE. In particular, a direct SCell activation can be used, where receiving the configuration information can trigger this direct SCell activation, as described in FIG. 11. Additionally or alternatively, the duration of the SCell activation procedure can be reduced by activating a serving cell with a particular SMTC configuration, reusing available coarse cell timing, reusing AGC estimation, and/or reusing Doppler shift estimation as applicable, as described in FIG. 12.

The operation flow/algorithmic structure 1300 may include, at 1308, receiving or sending data on an activated serving cell. In some embodiments, the activated serving cell provides a PDSCH or PDCCH, where the UE receives traffic data or control over the PDSCH or PDCCH, respectively. In other embodiments, the activated serving provides a PUSCH, where the UE sends traffic data over the PUSCH.

Figure 14:
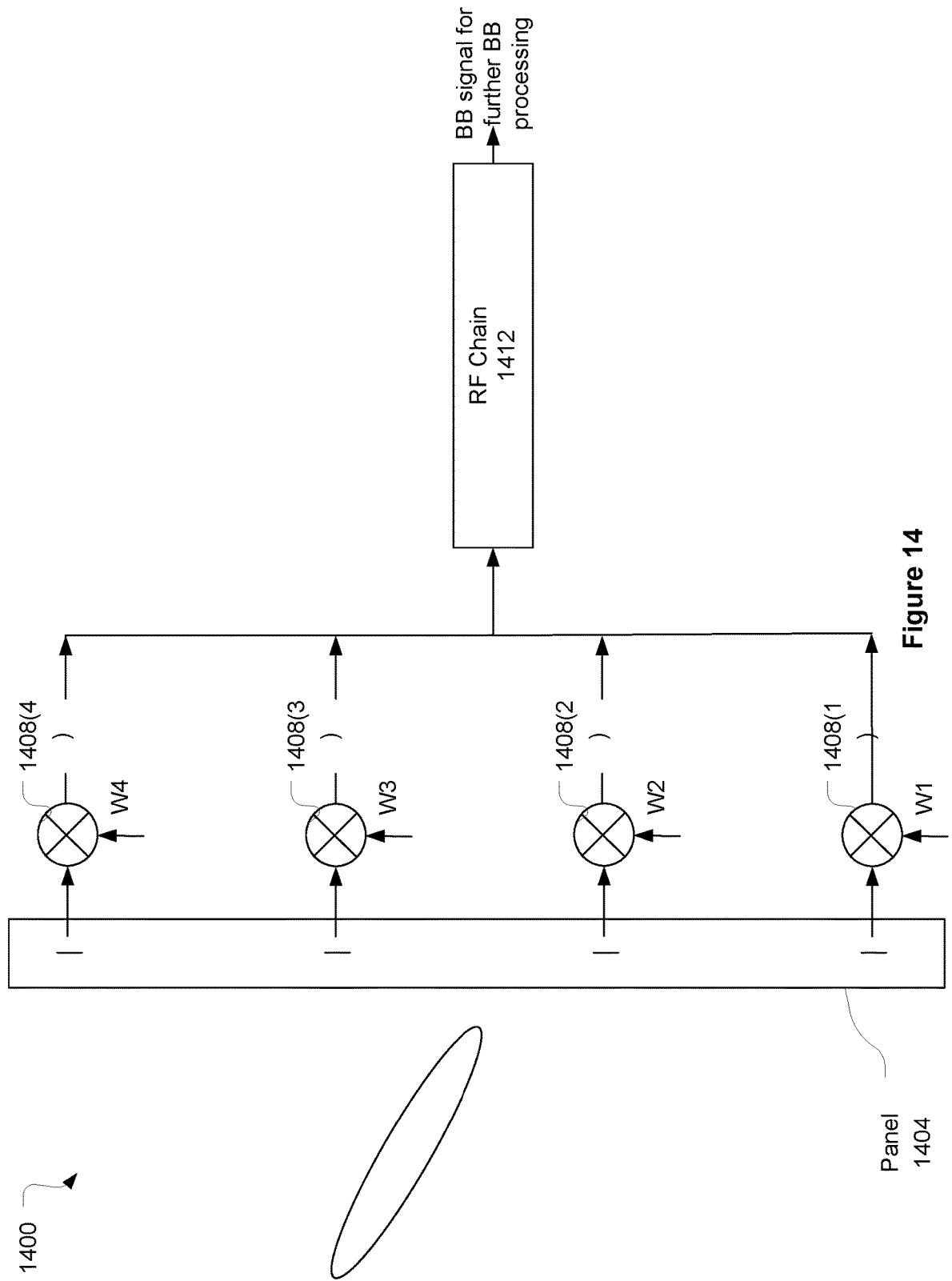
FIG. 14 illustrates an example of receive components, in accordance with some embodiments.

FIG. 14 illustrates receive components 1400 of the UE 104, in accordance with some embodiments. The receive components 1400 may include an antenna panel 1404 that includes a number of antenna elements. The panel 1404 is shown with four antenna elements, but other embodiments may include other numbers.

The antenna panel 1404 may be coupled to analog beamforming (BF) components that include a number of phase shifters 1408(1)-1408(4). The phase shifters 1408(1)-1408

(4) may be coupled with a radio-frequency (RF) chain 1412. The RF chain 1412 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1408(1)-1408(4) to provide a receive beam at the antenna panel 1404. These BF weights may be determined based on the channel-based beamforming.

Figure 15:
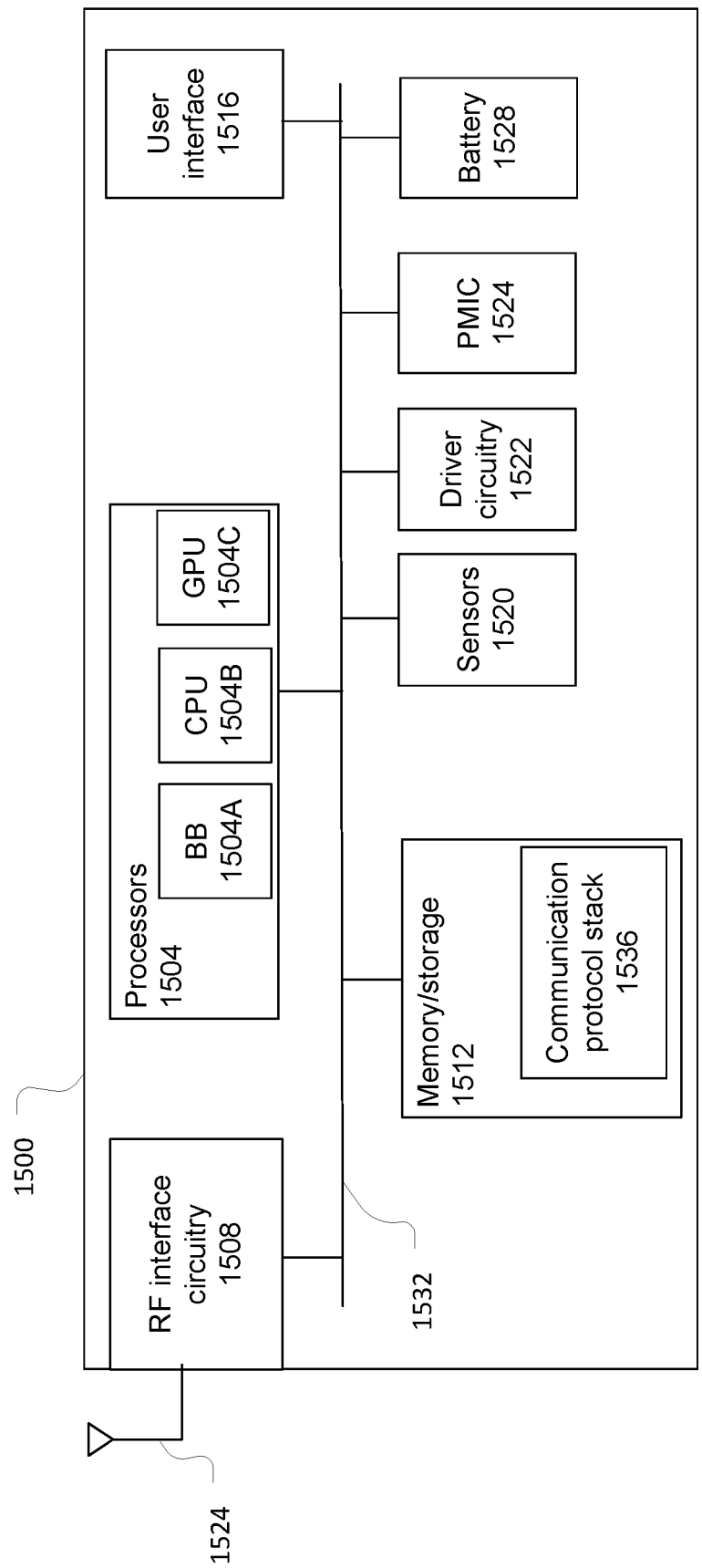
FIG. 15 illustrates an example of a UE, in accordance with some embodiments.

FIG. 15 illustrates a UE 1500, in accordance with some embodiments. The UE 1500 may be similar to and substantially interchangeable with UE 154 of FIG. 1.

Similar to that described above with respect to UE 154, the UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1500 may include processors 1504, RF interface circuitry 1508, memory/storage 1512, user interface 1516, sensors 1520, driver circuitry 1522, power management integrated circuit (PMIC) 1524, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangements of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry, such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network. In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1504A may also access group information 1524 from memory/storage 1512 to determine search space groups in which a number of repetitions of a PDCCH may be transmitted.

The memory/storage 1512 may include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory, such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1508 may include transceiver circuitry and a radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1524 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1524.

In various embodiments, the RF interface circuitry 1508 may be configured to transmit/receive signals in a manner compatible with NR access technologies.

The antenna 1524 may include a number of antenna elements that each convert electrical signals into radio waves to travel through the air and to convert received radio waves into electrical signals. The antenna elements may be arranged into one or more antenna panels. The antenna 1524 may have antenna panels that are omnidirectional, directional, or a combination thereof to enable beamforming and multiple input, multiple output communications. The antenna 1524 may include microstrip antennas, printed antennas fabricated on the surface of one or more printed circuit boards, patch antennas, phased array antennas, etc. The antenna 1524 may have one or more panels designed for specific frequency bands including bands in FR1 or FR2.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs)) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1522 may include software and hardware elements that operate to control particular devices that are embedded in the UE 1500, attached to the UE 1500, or otherwise communicatively coupled with the UE 1500. The driver circuitry 1522 may include individual drivers allowing other components to interact with or control various input/output (I/O) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a camera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

In some embodiments, the PMIC 1524 may control, or otherwise be part of, various power saving mechanisms of the UE 1500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1500 may power down for brief intervals of time and thus save power. If there is no data traffic activity for an extended period of time, then the UE 1500 may transition off to an RRC_Idle state, where it disconnects from the network and does not perform operations, such as channel quality feedback, handover, etc. The UE 1500 goes into a very low power state and it performs paging where again it periodically wakes up to listen to the network and then powers down again. The UE 1500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1528 may power the UE 1500, although in some examples the UE 1500 may be mounted deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

Figure 16:
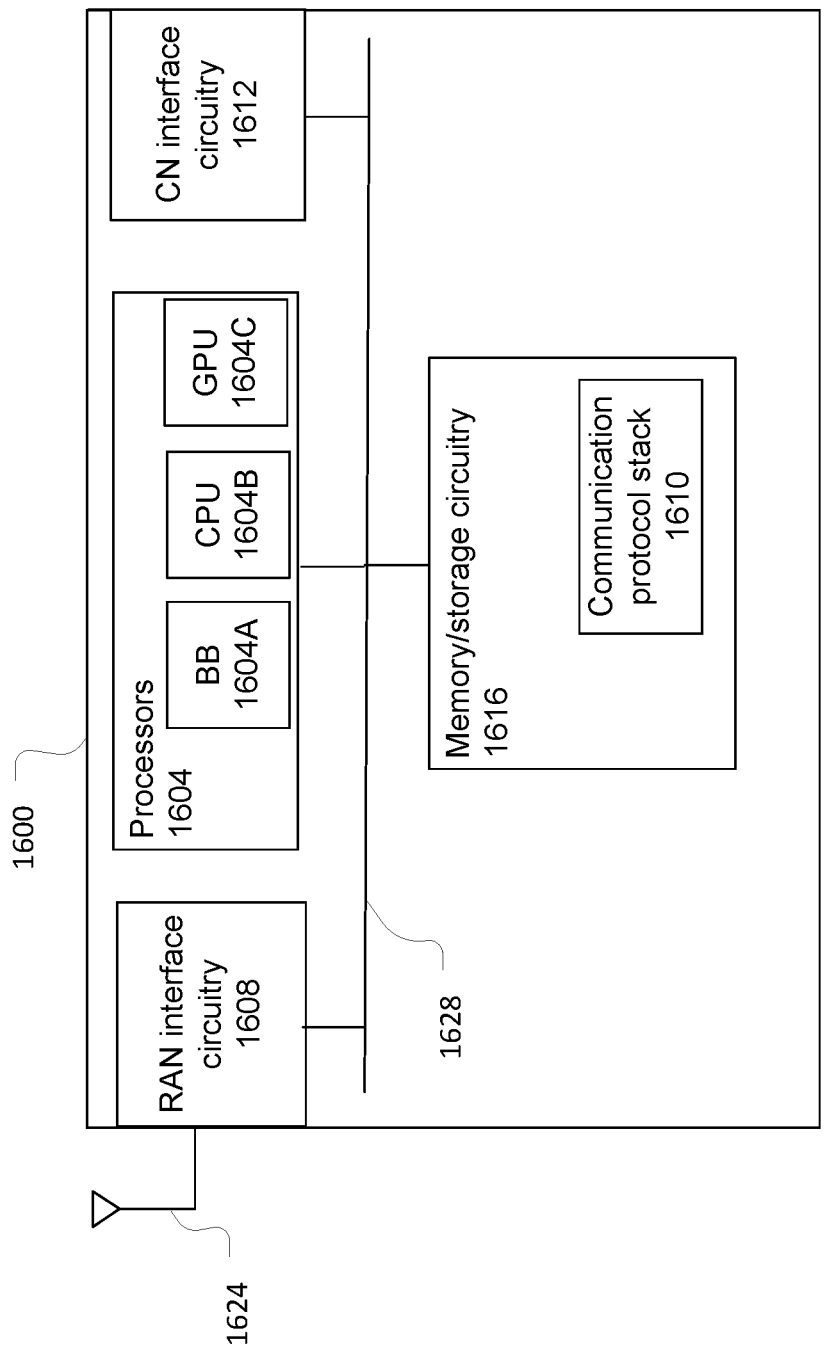
FIG. 16 illustrates an example of a base station, in accordance with some embodiments.

FIG. 16 illustrates a gNB 1600, in accordance with some embodiments. The gNB node 1600 may be similar to and substantially interchangeable with gNB 108. A base station, such as the base station 162, can have the same or similar components as the gNB 1600.

The gNB 1600 may include processors 1604, RF interface circuitry 1608, core network (CN) interface circuitry 1612, and memory/storage circuitry 1616.

The components of the gNB 1600 may be coupled with various other components over one or more interconnects 1628.

The processors 1604, RF interface circuitry 1608, memory/storage circuitry 1616 (including communication protocol stack 1610), antenna 1624, and interconnects 1628 may be similar to like-named elements shown and described with respect to FIG. 10.

The CN interface circuitry 1612 may provide connectivity to a core network, for example, a $5^{th}$ Generation Core network (5GC) using a 5GC-compatible network interface protocol, such as carrier Ethernet protocols, or some other suitable protocol. Network connectivity may be provided to/from the gNB 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method implemented by a user equipment (UE), the method comprising: receiving, from a base station, configuration information for carrier aggregation, wherein the configuration information indicates a set of serving cells, wherein at least one of: a size of the set, a location of a serving cell that is indicated in the set, or a component carrier of the serving cell is based on a high speed mode of the UE, and wherein the high speed mode is an operational mode that supports a travel speed of the UE larger than a speed threshold; performing an activation procedure of at least one serving cell from the set; and sending or receiving data on the at least one serving cell Example 2 includes a method of example 1, further comprising: sending, to the base station, UE capability information indicating that the UE supports the high speed mode Example 3 includes a method of example 2, wherein the UE capability information is sent in an information element that also indicates band combination capability of the UE.

Example 4 includes a method of example 2, wherein the UE capability information is sent in a first information element, and wherein the method further comprises: sending, to the base station, a second information element that indicates band combination capability of the UE Example 5 includes a method of example 2, wherein the UE capability information further indicates a number of serving cells that the UE supports for carrier aggregation in the high speed mode, wherein the size of the set is equal to or smaller than the number.

Example 6 includes a method of example 2, wherein the UE capability information further indicates band combinations of serving cells that the UE supports for carrier aggregation in the high speed mode, wherein the set includes serving cells having component carriers based on the band combinations.

Example 7 includes a method of any preceding example, wherein serving cells of the set are collocated serving cells.

Example 8 includes a method of any preceding example, further comprising: sending, to the base station, UE capability information indicating that the UE supports non-collocated serving cells in the high speed mode, wherein the configuration information indicates, based on the UE capability information, at least two serving cells that are non-collocated.

Example 9 includes a method of any preceding example, further comprising: sending, to the base station, UE capability information indicating whether the UE supports intra-band component carriers or inter-band component carriers, wherein the configuration information indicates, based on the UE capability information, serving cells of the set that have component carriers that are in a same band or in different bands.

Example 10 includes a method of any preceding example, further comprising: sending, to the base station, UE capability information indicating that the UE supports inter-band component carriers and further indicating whether the UE supports non-collocated serving cells, wherein the configuration information indicates, based on the UE capability information, serving cells of the set that that are collocated or non-collocated and have component carriers that are in different bands.

Example 11 includes a method of any preceding example, wherein the configuration information further indicates an intra-frequency measurement object for the at least one serving cell, and wherein the method further comprises: selecting the at least one serving cell for activation based on the intra-frequency measurement object.

Example 12 includes a method implemented by a base station, the method comprising: determining that a UE is in a high speed mode, wherein the high speed mode is an operational mode that supports a travel speed of the UE larger than a speed threshold; generating configuration information for carrier aggregation, wherein the configuration information indicates a set of serving cells, wherein at least one of: a size of the set, a location of a serving cell that is indicated in the set, or a component carrier of the serving cell is based on the high speed mode; and sending the configuration information to the UE.

Example 13 includes a method of example 12, wherein a size of the set has an upper bound that is pre-defined in a configuration of the base station.

Example 14 includes a method of any preceding example 12-13, further comprising: selecting at least one serving cell from the set; and including, in the configuration information, an intra-frequency measurement object associated with the at least one serving cell.

Example 15 includes a method of any preceding example 12-14, further comprising: determining, based on the high speed mode, serving cells that are collocated; and including, in the configuration information, identifiers of the serving cells, wherein the identifiers indicate the set of serving cells.

Example 16 includes a method of any preceding example 12-15, further comprising: determining, based on the high speed mode, intra-band component carriers; and including, in the configuration information, identifiers of serving cells that have the intra-band component carriers, wherein the identifiers indicate the set of serving cells Example 17 includes a method of any preceding example 12-16, further comprising: determining, based on the high speed mode, serving cells that are collocated and that have inter-band component carriers; and including, in the configuration information, identifiers of the serving cells, wherein the identifiers indicate the set of serving cells.

Example 18 includes a method implemented by a user equipment (UE), the method comprising: receiving, from a base station, configuration information for carrier aggregation, wherein the configuration information indicates a set of serving cells; performing an activation procedure of at least a serving cell from the set, wherein at least one of: a trigger for the activation procedure or a duration of the activation procedure is based on a high speed mode of the UE, wherein the high speed mode is an operational mode that supports a travel speed of the UE larger than a speed threshold; and sending or receiving data on the serving cell.

Example 19 includes a method of example 18, wherein the configuration information comprises RRC configuration information, wherein the method further comprises: sending, to the base station, UE capability information indicating that the UE supports the high speed mode, wherein the activation procedure is directly performed upon receiving the RRC configuration information and absent of a media access control (MAC) control element (CE) to activate the serving cell, and wherein the RRC configuration information corresponds to a serving cell addition or a handover Example 20 includes a method of any preceding example 18-19, wherein performing the activation procedure comprises reducing, based on the high speed mode, the duration of the activation procedure by performing at least one of: selecting the serving cell for activation based on a determination that the serving cell has a synchronization signal block (SSB) measurement timing configuration (SMTC) that is smaller than a time threshold; using cell timing information associated with an already activated serving cell in the activation procedure of the serving cell; using antenna gain control (AGC) associated with the already activated serving cell in the activation procedure of the serving cell; or using Doppler shift estimation associated with the already activated serving cell for Doppler shift in the activation procedure of the serving cell.

Example 21 includes a UE comprising means to perform one or more elements of a method described in or related to any of the examples 1-11 or 18-20.

Example 22 includes one or more non-transitory computer-readable media comprising instructions to cause a UE, upon execution of the instructions by one or more processors of the UE, to perform one or more elements of a method described in or related to any of the examples 1-11 or 18-20.

Example 23 includes a UE comprising logic, modules, or circuitry to perform one or more elements of a method described in or related to any of the examples 1-11 or 18-20.

Example 24 includes a UE comprising: one or more processors and one or more computer-readable media comprising instructions that, when executed by the one or more processors, cause the one or more processors to perform one or more elements of a method described in or related to any of the examples 1-11 or 18-20.

Example 25 includes a system comprising means to perform one or more elements of a method described in or related to any of the examples 1-11 or 18-20.

Example 26 includes a base station comprising means to perform one or more elements of a method described in or related to any of the examples 12-17.

Example 27 includes one or more non-transitory computer-readable media comprising instructions to cause a base station, upon execution of the instructions by one or more processors of the UE, to perform one or more elements of a method described in or related to any of the examples 12-17.

Example 28 includes a base station comprising logic, modules, or circuitry to perform one or more elements of a method described in or related to any of the examples 12-17.

Example 29 includes a base station comprising: one or more processors and one or more computer-readable media comprising instructions that, when executed by the one or more processors, cause the one or more processors to perform one or more elements of a method described in or related to any of the examples 12-17.

Example 30 includes a system comprising means to perform one or more elements of a method described in or related to any of the examples 12-17.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method implemented by a user equipment (UE), the method comprising:
    receiving, from a base station, configuration information for carrier aggregation, wherein the configuration information indicates a set of serving cells, wherein at least one of: a size of the set, a location of a serving cell that is indicated in the set, or a component carrier of the serving cell is based on a high speed mode of the UE, and wherein the high speed mode is an operational mode that supports a travel speed of the UE larger than a speed threshold;
    performing an activation procedure of at least one serving cell from the set; and
    sending or receiving data on the least one serving cell.

2. The method of claim 1, further comprising:
    sending, to the base station, UE capability information indicating that the UE supports the high speed mode.

3. The method of claim 2, wherein the UE capability information is sent in an information element that also indicates band combination capability of the UE.

4. The method of claim 2, wherein the UE capability information is sent in a first information element, and wherein the method further comprises:
    sending, to the base station, a second information element that indicates band combination capability of the UE.

5. The method of claim 2, wherein the UE capability information further indicates a number of serving cells that the UE supports for carrier aggregation in the high speed mode, wherein the size of the set is equal to or smaller than the number.

6. The method of claim 2, wherein the UE capability information further indicates band combinations of serving cells that the UE supports for carrier aggregation in the high speed mode, wherein the set includes serving cells having component carriers based on the band combinations.

7. The method of claim 1, wherein serving cells of the set are collocated serving cells.

8. The method of claim 1, further comprising:
    sending, to the base station, UE capability information indicating that the UE supports non-collocated serving cells in the high speed mode, wherein the configuration information indicates, based on the UE capability information, at least two serving cells that are non-collocated.

9. The method of claim 1, further comprising:
    sending, to the base station, UE capability information indicating whether the UE supports intra-band component carriers or inter-band component carriers, wherein the configuration information indicates, based on the UE capability information, serving cells of the set that have component carriers that are in a same band or in different bands.

10. The method of claim 1, further comprising:
    sending, to the base station, UE capability information indicating that the UE supports inter-band component carriers and further indicating whether the UE supports non-collocated serving cells, wherein the configuration information indicates, based on the UE capability information, serving cells of the set that that are collocated or non-collocated and have component carriers that are in different bands.

11. The method of claim 1, wherein the configuration information further indicates an intra-frequency measurement object for the at least one serving cell, and wherein the method further comprises:
selecting the at least one serving cell for activation based on the intra-frequency measurement object.

12. A base station comprising:
one or more processors; and
one or more memories storing computer-readable instructions that, upon execution by the one or more processors, configure the base station to:
determine that a UE is in a high speed mode, wherein the high speed mode is an operational mode that supports a travel speed of the UE larger than a speed threshold;
generate configuration information for carrier aggregation, wherein the configuration information indicates a set of serving cells, wherein at least one of: a size of the set, a location of a serving cell that is indicated in the set, or a component carrier of the serving cell is based on the high speed mode; and
send the configuration information to the UE.

13. The base station of claim 12, wherein a size of the set has an upper bound that is pre-defined in a configuration of the base station.

14. The base station of claim 12, wherein the execution of the computer-readable instructions further configures the base station to:
select at least one serving cell from the set; and
include, in the configuration information, an intra-frequency measurement object associated with the at least one serving cell.

15. The base station of claim 12, wherein the execution of the computer-readable instructions further configures the base station to:
determine, based on the high speed mode, serving cells that are collocated; and
include, in the configuration information, identifiers of the serving cells, wherein the identifiers indicate the set of serving cells.

16. The base station of claim 12, wherein the execution of the computer-readable instructions further configures the base station to:
determine, based on the high speed mode, intra-band component carriers; and
include, in the configuration information, identifiers of serving cells that have the intra-band component carriers, wherein the identifiers indicate the set of serving cells.

17. The base station of claim 12, wherein the execution of the computer-readable instructions further configures the base station to:

determine, based on the high speed mode, serving cells that are collocated and that have inter-band component carriers; and
include, in the configuration information, identifiers of the serving cells, wherein the identifiers indicate the set of serving cells.

18. A user equipment (UE) comprising:
one or more processors; and
one or more memories storing computer-readable instructions that, upon execution by the one or more processors, configure the UE to:
receive, from a base station, configuration information for carrier aggregation, wherein the configuration information indicates a set of serving cells;
perform an activation procedure of at least a serving cell from the set, wherein at least one of: a trigger for the activation procedure or a duration of the activation procedure is based on a high speed mode of the UE, wherein the high speed mode is an operational mode that supports a travel speed of the UE larger than a speed threshold; and
send or receive data on the serving cell.

19. The UE of claim 18, wherein the configuration information comprises RRC configuration information, wherein the execution of the computer-readable instructions further configures the UE to:
send, to the base station, UE capability information indicating that the UE supports the high speed mode, wherein the activation procedure is directly performed upon receiving the RRC configuration information and absent of a media access control (MAC) control element (CE) to activate the serving cell, and wherein the RRC configuration information corresponds to a serving cell addition or a handover.

20. The UE of claim 18, wherein performing the activation procedure comprises reducing, based on the high speed mode, the duration of the activation procedure by performing at least one of:
selecting the serving cell for activation based on a determination that the serving cell has a synchronization signal block (SSB) measurement timing configuration (SMTC) that is smaller than a time threshold;
using cell timing information associated with an already activated serving cell in the activation procedure of the serving cell;
using antenna gain control (AGC) associated with the already activated serving cell in the activation procedure of the serving cell; or
using Doppler shift estimation associated with the already activated serving cell for Doppler shift in the activation procedure of the serving cell.

* * * * *